United States Patent
Yamamoto et al.

(10) Patent No.: US 8,609,230 B2
(45) Date of Patent: Dec. 17, 2013

(54) RESIN SUBSTRATE PROVIDED WITH HARD COATING FILM AND ITS PRODUCTION PROCESS

(75) Inventors: Kyoko Yamamoto, Tokyo (JP); Takashi Shibuya, Tokyo (JP); Kyon Hun Min, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/531,903

(22) Filed: Jun. 25, 2012

(65) Prior Publication Data

US 2012/0263932 A1    Oct. 18, 2012

Related U.S. Application Data

(63) Continuation of application No. PCT/JP2010/073025, filed on Dec. 21, 2010.

(30) Foreign Application Priority Data

Dec. 25, 2009 (JP) ................................. 2009-295347

(51) Int. Cl.
*B32B 7/02* (2006.01)

(52) U.S. Cl.
USPC .......................................... 428/212; 428/220

(58) Field of Classification Search
USPC ...................................... 428/212, 220, 411.1
See application file for complete search history.

(56) References Cited

U.S. PATENT DOCUMENTS

| | | |
|---|---|---|
| 2010/0227161 A1 | 9/2010 | Shibuya et al. |
| 2012/0058333 A1 | 3/2012 | Yamamoto et al. |

FOREIGN PATENT DOCUMENTS

| | | |
|---|---|---|
| CA | 1 196 534 A1 | 11/1985 |
| JP | 3-168227 A | 7/1991 |
| JP | 06-003504 | 1/1994 |
| JP | 8-309934 A | 11/1996 |
| JP | 2002-036870 | 2/2002 |
| JP | 2004-299195 | 10/2004 |

OTHER PUBLICATIONS

Ekinaka et al (JP 2002-036870 machine translation), Feb. 6, 2002.*
U.S. Appl. No. 13/589,600, filed Aug. 20, 2012, Shibuya, et al.
U.S. Appl. No. 13/541,874, filed Jul. 5, 2012, Yamamoto, et al.
International Search Report issued Mar. 15, 2011 in PCT/JP2010/073025 filed Dec. 21, 2010.
Extended European Search Report issued Jul. 2, 2013, in European patent Application No. 10839408.1.
U.S. Appl. No. 13/923,737, filed Jun. 21, 2013, Shibuya, et al.

* cited by examiner

*Primary Examiner* — Mark Ruthkosky
*Assistant Examiner* — Lawrence Ferguson
(74) *Attorney, Agent, or Firm* — Oblon, Spivak, McClelland, Maier & Neustadt, L.L.P.

(57) ABSTRACT

A resin substrate includes a primer layer, a hard coating layer, and a middle layer between the primer layer and the hard coating layer. The primer layer contains an acrylic polymer as a main component, the hard coating layer contains a cured product of an organopolysiloxane as a main component, and the middle layer includes a mixture of components constituting both the primer layer and the hard coating layer. The middle layer has a thickness Mt, the hard coating layer has a thickness Ht, and a ratio Mt/Ht is from 0.05 to 1.0.

19 Claims, 1 Drawing Sheet

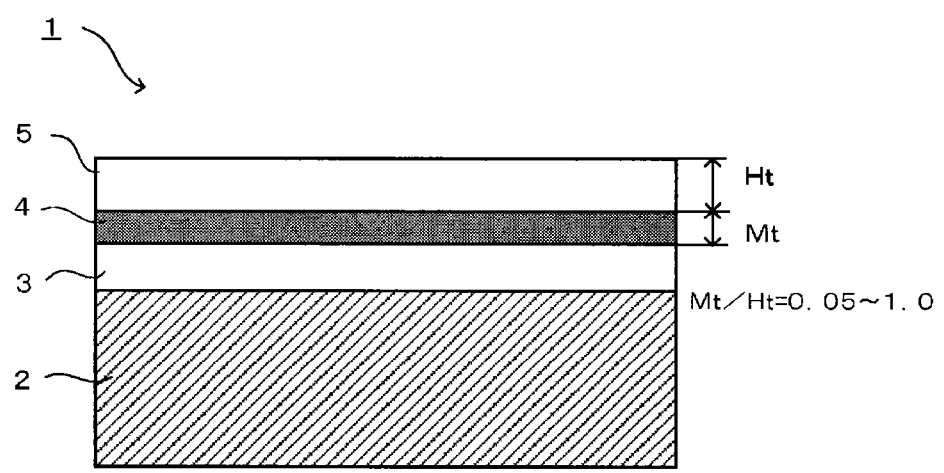

RESIN SUBSTRATE PROVIDED WITH HARD COATING FILM AND ITS PRODUCTION PROCESS

TECHNICAL FIELD

The present invention relates to a resin substrate provided with a hard coating film, and its production process.

BACKGROUND ART

In recent years, as a window glass for a vehicle such as an automobile and a window glass for a building material to be attached to a building construction such as a house or a building, demands for a transparent resin plate are increasing instead of a conventional inorganic glass plate. Particularly, for a vehicle such as an automobile, for weight saving, use a transparent resin plate as a window material has been proposed, and especially, an aromatic polycarbonate transparent resin plate is excellent in fracture resistance, transparency, light weight properties, easy processability, etc., and its use has been studied as a promising window material for a vehicle. However, such a transparent resin plate has had problems with respect to the abrasion resistance or weather resistance when it is used in place of a glass plate. Therefore, it has been proposed to form a coating film on the surface of a transparent resin plate by means of various hard coating agents, particularly silicone type hard coating agents, for the purpose of improving the abrasion resistance and weather resistance of the transparent resin plate. Further, when a coating film (hard coating layer) is formed on the transparent resin plate by means of a silicone type hard coating agent, it has been proposed to employ a primer layer so as to improve the adhesion between the hard coating layer and the transparent resin plate.

However, in a case where a primer layer is employed, there are a problem of the impact resistance of the primer layer, a problem of the adhesion between the primer layer and the hard coating layer, and a problem of weather resistance such as formation of cracks or a decrease in the adhesion after long term use of the coating film as a whole. Accordingly, Patent Document 1 proposes a technique to use a polysiloxane type crosslinked rubber for the primer layer for the purpose improving the impact resistance of the primer layer and the adhesion to the silicone type hard coating layer.

PRIOR ART DOCUMENTS

Patent Documents

Patent Document 1: JP-A-6-3504

DISCLOSURE OF INVENTION

Technical Problem

The present invention has been made to solve the above problems of prior art, and its object is to provide a resin substrate provided with a hard coating film having a silicone type hard coating layer provided on the resin substrate via a primer layer, which has excellent abrasion resistance and also has excellent weather resistance such as weather-resistant adhesion and weather-cracking resistance of the hard coating layer, and its production process.

Solution to Problem

The resin substrate provided with a hard coating film of the present invention is a resin substrate provided with a hard coating film, comprising a resin substrate and on at least one side of the resin substrate, a primer layer, a middle layer and a hard coating layer in this order from the resin substrate side, wherein the primer layer contains an acrylic polymer as the main component, the hard coating layer contains a cured product of an organopolysiloxane as the main component, the middle layer contains the above acrylic polymer and a cured product of the above organopolysiloxane as the main components, and when the thickness of the middle layer is Mt and the thickness of the hard coating layer is Ht, the ratio in thickness of the middle layer to the hard coating layer represented by Mt/Ht is from 0.05 to 1.0.

Further, the process for producing a resin substrate provided with a hard coating film of the present invention is a process for producing the resin substrate provided with a hard coating film of the present invention, which comprises a step of applying a primer composition containing the above acrylic polymer as the main component to at least one side of the resin substrate and drying it to form the primer layer, and a step of applying a hard coating composition containing the above organopolysiloxane having the pH adjusted so that the ratio in thickness of the middle layer to the hard coating layer represented by Mt/Ht is from 0.05 to 1.0, on the primer layer, followed by curing to form the middle layer and the hard coating layer.

Advantageous Effects of Invention

The resin substrate provided with a hard coating film of the present invention is excellent in the abrasion resistance and is also excellent in the weather resistance such as weather-resistant adhesion and the weather-cracking resistance of the hard coat layer. Further, according to the production process of the present invention, a resin substrate provided with a hard coating film excellent in the abrasion resistance and also excellent in the weather resistance of the hard coat layer, can be obtained.

BRIEF DESCRIPTION OF DRAWING

FIG. 1 is a cross-sectional view schematically illustrating a resin substrate provided with a silicone type hard coating film of the present invention.

DESCRIPTION OF EMBODIMENTS

Now, embodiment of the present invention will be described below.

[Resin Substrate Provided with Hard Coating Film of the Present Invention]

The resin substrate provided with a hard coating film of the present invention is a resin substrate provided with a hard coating film, comprising a resin substrate and on at least one side of the resin substrate, a primer layer containing an acrylic polymer as the main component (hereinafter sometimes referred to as "acrylic primer layer"), a middle layer and a hard coating layer containing a cured product of an organopolysiloxane as the main component (hereinafter sometimes referred to as "silicone type hard coating layer"), wherein the middle layer contains the acrylic polymer which the primer layer contains and a cured product of the organopolysiloxane which the hard coating layer contains, as the main components, and has the following characteristics.

With reference to a cross-sectional view schematically illustrating a resin substrate provided with a hard coating film of the present invention as shown in FIG. 1, a resin substrate 1 provided with a hard coating film of the present invention has a structure such that on a resin substrate 2, an acrylic primer layer 3, a middle layer 4 and a silicone type hard coating layer 5 are laminated in this order, and the relation Mt/Ht between the thickness Mt of the middle layer 4 and the silicone type hard coating layer 5 is from 0.05 to 1.0.

(1) Middle Layer

The middle layer which the resin substrate provided with a hard coating film of the present invention has is a middle layer comprising components of the acrylic primer layer and the silicone type hard coating layer, formed between these layers. More specifically, the middle layer is a layer having the component constituting the primer layer containing an acrylic polymer as the main component and the component constituting the hard coating layer containing a cured product of an organopolysiloxane as the main component, mixed. This middle layer does not necessarily has a uniform composition in the thickness direction in this layer, however, it is distinctly different in the composition from the adjacent acrylic primer layer and silicone type hard coating layer even in the vicinity of each interface, and accordingly the interfaces with these adjacent layers are substantially distinguishable. Specifically, the middle layer is distinguished as a layer having a distinctly different composition from the acrylic primer layer and the silicone type hard coating layer, e.g. by a compositional image in BE mode (COMP image) of a cross section of the hard coating film by a scanning electron microscope, SiKα ray intensity measurement analysis of the cross section of the hard coating film by a field emission electron probe microanalyzer (FE-EPMA), or a compositional analysis in a depth direction of the hard coating film by a scanning X-ray photoelectron spectrometer (μ-ESCA).

In this specification, the "hard coating film" means a coating film consisting of a single layer or multiple layers including the hard coating layer formed on the resin substrate. That is, in the resin substrate provided with a hard coating film of the present invention, the entire coating film including the acrylic primer layer, the middle layer and the silicone type hard coating layer is referred to as a "hard coating film".

In the present invention, by the presence of the middle layer, the weather-resistant adhesion between the silicone type hard coating layer and the acrylic primer layer is imparted. The mixing state of the respective constituting components in the middle layer is not clearly understood, and it is considered that, for example, when polymethyl methacrylate is used as the acrylic polymer, this is partially hydrolyzed, and the methyl carboxylate groups at its side chains are converted to carboxylic acid, whereby the compatibility between the silicone type hard coating layer and the acrylic primer layer is improved to form a middle layer comprising components in both layers and as a result, the weather-resistant adhesion is improved.

In the resin substrate provided with a hard coating film of the present invention, when the thickness of the middle layer is Mt and the thickness of the silicone type hard coating layer is Ht, the ratio in thickness of the middle layer to the hard coating layer represented by Mt/Ht is from 0.05 to 1.0, preferably from 0.1 to 0.95.

In the present invention, as described above, by the presence of the middle layer between the silicone type hard coating layer and the acrylic primer layer, weather-resistant adhesion between these layers is imparted, however, if the thickness of the middle layer is thicker than necessary relative to the thickness of the silicone type hard coating layer, the weather-cracking resistance may be impaired. The thickness ratio Mt/Ht thus selected is at most 1.0 as mentioned above. Mt/Ht is preferably at most 0.95 as mentioned above.

Further, in order to improve the weather-resistant adhesion, the middle layer should be present with such a thickness that the Mt/Ht value becomes at least 0.05, and in the present invention, preferably, the thicknesses of the silicone type hard coating layer and the middle layer are controlled so that the Mt/Ht value is at least 0.1 as mentioned above, whereby in the resin substrate provided with a hard coating film of the present invention, a sufficient weather-resistant adhesion between the silicone type hard coating layer and the acrylic primer layer can be imparted.

Here, in the resin substrate provided with a hard coating film of the present invention, usually the middle layer is not formed by itself. For example, it is formed on the acrylic primer layer preliminarily formed on the resin substrate, at the same time as formation of the silicone type hard coating layer while conditions are adjusted so that the thicknesses of the silicone type hard coating layer and the middle layer satisfy the above range. Accordingly, the method of forming the middle layer is described in the after-mentioned description for the hard coating layer.

Now, the respective constituting elements other than the middle layer, constituting the resin substrate provided with a hard coating film of the present invention having such a middle layer, will be described in detail below.

(2) Resin Substrate

The resin as a material of the resin substrate used in the present invention may, for example, be a polycarbonate resin, a polystyrene resin, an aromatic polyester resin, an acrylic resin, a polyester resin, a polyarylate resin, a polycondensation product of halogenated bisphenol A and ethylene glycol, an acrylic urethane resin, or a halogenated aryl group-containing acrylic resin.

Among them, a polycarbonate resin such as an aromatic polycarbonate resin or an acrylic resin such as a polymethyl methacrylate type acrylic resin is preferred, and a polycarbonate resin is more preferred. Further, among polycarbonate resins, particularly a bisphenol A type polycarbonate resin is preferred. The resin substrate may contain two or more types of the above thermoplastic resins, or may be a laminated substrate having two or more layers laminated by using such resins. Further, the shape of the resin substrate is not particularly limited, and it may be a flat plate or curved. Further, the color of the resin substrate is preferably colorless transparent or colored transparent.

(3) Primer Layer

The resin substrate provided with a hard coating film of the present invention has a primer layer containing an acrylic polymer as the main component on at least one side of the resin substrate. The primer layer is a layer provided to improve the adhesion between the resin substrate and the after-mentioned silicone type hard coating layer, and the adhesion of the primer layer in the resin substrate provided with a hard coating film of the present invention to the resin substrate is secured by direct contact, and the adhesion to the silicone type hard coating layer is secured via the middle layer.

As the acrylic polymer mainly constituting the primer layer, usually an acrylic polymer to be used for forming a primer layer to make the resin substrate and the silicon type hard coating layer adhere to each other, which makes formation of the middle layer possible, may be used without any particular restriction. From such a viewpoint, the acrylic polymer used in the present invention is preferably a homopolymer or copolymer comprising a monomer selected from monomers having an acryloyl group or a methacryloyl group, as the main monomer units. Further, the monomer may, for example, be specifically a (meth)acrylate, and in the present invention, a monomer having a methacryloyl group is preferred.

In this specification, "(meth)acrylic" or "(meth)acrylate", such as a (meth)acrylate, means both of "acrylic" and "methacrylic", or both of "acrylate" and "methacrylate".

Further, the monomer having a methacryloyl group is preferably at least one member selected from alkyl methacrylates having an alkyl group having at most 6 carbon atoms. That is, the acrylic polymer is preferably a homopolymer made of at least one member selected from alkyl methacrylates (the alkyl group having at most 6 carbon atoms) as "the main monomer" (specifically, from 90 to 100 mol % based on the entire raw material monomers, the same applies hereinafter), or a copolymer of such monomers. Further, also preferred is a copolymer of the above main monomer with at least one member of other acrylates and methacrylates. Such other monomers may, for example, be acrylates or methacrylates having an alkyl group having at least 7 carbon atoms or a cycloalkyl group having at most 12 carbon atoms. Further, a copolymer obtainable by copolymerizing, together with such a monomer, an acrylate or a methacrylate (for example, 2-hydroxyethyl (meth)acrylate) having a functional group-containing alkyl group (for example, a hydroxyalkyl group), or (meth)acrylic acid, may also be used. The cycloalkyl group may, for example, be a cyclohexyl group, a 4-methylcyclohexyl group, a 4-t-butylcyclohexyl group, an isobornyl group, a dicyclopentanyl group or a dicyclopentenyloxyethyl group.

Further, among the methacrylates having an alkyl group having at most 6 carbon atoms, particularly preferred as the acrylic polymer to be used in the present invention is a homopolymer obtainable by polymerizing one or more members selected from methyl methacrylate, n-butyl methacrylate, tert-butyl methacrylate, ethyl methacrylate, isobutyl methacrylate and the like, or a copolymer of such monomers. More preferred is a homopolymer of methyl methacrylate, tert-butyl methacrylate, ethyl methacrylate or the like, or a copolymer of methyl methacrylate with one or more types selected from n-butyl methacrylate, ethyl methacrylate and isobutyl methacrylate.

Further, it is also possible to employ an acrylic polymer obtained by polymerizing or copolymerizing at least one member selected from acrylic monomers having a hydrolyzable silyl group and/or a SiOH group bonded via a C—Si bond.

Such acrylic monomers may, for example, be 3-methacryloyloxypropyltrimethoxysilane, 3-methacryloyloxypropylmethyldimethoxysilane, 3-methacryloyloxypropyldimethylmethoxysilane, 3-methacryloyloxypropyltriethoxysilane, 3-methacryloyloxypropylmethyldiethoxysilane, 3-acryloyloxypropyltrimethoxysilane, 3-acryloyloxypropylmethyldimethoxysilane, etc.

Further, such acrylic polymers to be used for forming a primer layer preferably have a mass average molecular weight of at least 20,000, more preferably at least 50,000 and preferably at most 1,000,000. An acrylic polymer having a mass average molecular weight within this range is preferred since the performance such as the adhesion or strength as a primer layer can be sufficiently provided, and excellent hydrolysis properties and solubility in formation of the middle layer are obtained. In this specification, the mass average molecular weight is a value measured by a gel permeation chromatography method by using polystyrene as a standard substance.

Such an acrylic polymer is also commercially available, and in the present invention, commercially available products thereof, for example, commercially available products as solutions having the acrylic polymer preliminarily dissolved in a proper solvent, such as acrylic primer SHP470 (tradename, manufactured by Momentive Performance Materials, Inc., polymethyl methacrylate (PMMA), mass average molecular weight: 270,000) and DIANAL LR269 (tradename, manufactured by MITSUBISHI RAYON CO., LTD., polymethyl methacrylate (PMMA), mass average molecular weight: 100,000) may be used. Further, it is possible to use an acrylic polymer such as DIANAL BR80 (tradename, manufactured by MITSUBISHI RAYON CO., LTD., polymethyl methacrylate (PMMA), mass average molecular weight: 90,000), DIANAL BR88 (tradename, manufactured by MITSUBISHI RAYON CO., LTD., polymethyl methacrylate (PMMA), mass average molecular weight: 430,000) or M-4003 (tradename, manufactured by Negami Chemical industrial Co., Ltd., polymethyl methacrylate (PMMA), mass average molecular weight: 700,000 to 1,300,000) after dissolved in a solvent. Further, it is also possible to mix at least two of such acrylic polymers.

The primer layer may contain an ultraviolet absorber in order to prevent yellowing of the resin substrate. As the ultraviolet absorber, the same one as the above described ultraviolet absorber contained in the hard coating composition of the present invention may be employed. One of such ultraviolet absorbers may be used alone, or two or more of them may be used in combination. The content of the ultraviolet absorber in the primer layer is preferably from 1 to 50 parts by mass, particularly preferably from 1 to 30 parts by mass, per 100 parts by mass of the resin component such as the acrylic polymer, etc.

The primer layer may further contain a photostabilizer or the like. The photostabilizer may, for example, be a hindered amine; or a nickel complex such as nickel bis(octylphenyl) sulfide, nickel complex-3,5-di-tert-butyl-4-hydroxybenzyl phosphoric acid monoethylate or nickel dibutyl dithiocarbonate. Two or more of them may be used in combination. The content of the photostabilizer in the primer layer is preferably from 0.1 to 50 parts by mass, particularly preferably from 0.5 to 10 parts by mass, per 100 parts by mass of the resin component such as the acrylic polymer, etc.

For the resin substrate provided with a hard coating film of the present invention, a method of forming the primer layer on at least one side of the resin substrate is not particularly limited, and preferred is a method of applying a primer composition containing the acrylic polymer, the ultraviolet absorber and a solvent to the resin substrate and drying it.

A solvent is usually contained in the primer composition to be used for forming the primer layer. The solvent is not particularly limited so long as it is a solvent capable of stably dissolving the acrylic polymer. Specifically, it may, for example, be a ketone such as acetone, methyl ethyl ketone, methyl isobutyl ketone or cyclohexanone; an ether such as tetrahydrofuran, 1,4-dioxane or 1,2-dimethoxyethane; an ester such as ethyl acetate, butyl acetate or methoxyethyl acetate; an alcohol such as methanol, ethanol, 1-propanol, 2-propanol, 1-butanol, 2-butanol, 2-methyl-1-propanol, 2-methoxyethanol, 4-methyl-2-penanol, 2-buthoxyethanol, 1-methoxy-2-propanol or diacetone alcohol; a hydrocarbon such as n-hexane, n-heptane, isooctane, benzene, toluene, xylene, gasoline, light oil or kerosene; acetonitrile, nitromethane or water. Two or more of them may be used in combination.

The amount of the solvent is preferably from 50 to 10,000 pars by mass, particularly preferably from 100 to 10,000 parts by mass, per 100 parts by mass of the resin component such as the acrylic polymer, etc. Further, the content of the non-volatile component (solid content) in the primer composition is preferably from 0.5 to 75 mass %, particularly preferably from 1 to 40 mass %, based on the total amount of the composition.

The above primer composition may further contain additives such as a leveling agent, a defoaming agent, a viscosity-adjusting agent, etc.

The method for applying the primer composition on the resin substrate is not particularly limited, but a spray coating method, a dip coating method or a flow coating method may, for example, be mentioned. Further, the heating conditions for drying are not particularly limited, but they are preferably from 50 to 140° C. for from 5 minutes to 3 hours.

The thickness of the primer layer formed on the resin substrate by using the primer composition (the thickness in a state before the middle layer and the silicone type hard coating layer are formed on the primer layer) is not particularly limited so long as it satisfies requirements required as the primer layer in the resin substrate provided with a hard coating film finally obtainable. However, it is properly adjusted considering the thicknesses of the silicone type hard coating layer and the middle layer to be formed on the primer layer as described hereinafter.

In the resin substrate provided with a hard coating film finally obtainable, if the thickness of the acrylic primer layer is too thin, yellowing by deterioration in the weather resistance of the resin substrate itself cannot sufficiently be prevented, and yellowing, the weather-cracking resistance and the weather-resistant adhesion of the resin substrate provided with a hard coating film tend to be deteriorated and as a result, the weather resistance of the resin substrate provided with a hard coating film will be lowered. The thickness of the acrylic primer layer in the resin substrate provided with a hard coating film finally obtainable may be thinner than the thickness in a state before the middle layer and the silicone type hard coating layer are formed on the primer layer, by formation of the middle layer and the silicone type hard coating layer on the primer layer. Accordingly, the thickness of the primer layer in a state before the middle layer and the silicone type hard coating layer are formed on the primer layer should be a thickness required to sufficiently bond the resin substrate and the hard coating layer and to maintain required amounts of the above additives, and should be a thickness sufficient to form the middle layer.

Here, with respect to the thickness of the acrylic primer layer formed on the resin substrate is a thickness after the primer layer is formed, and with respect to the thickness before the middle layer and the silicone type hard coating layer are formed, it is necessary to consider the thickness of the middle layer formed at the same time as formation of the hard coating layer by using a part of the primer layer. The thickness of the acrylic primer layer before such a middle layer and a silicone type hard coating layer are formed, is specifically preferably at least 1 µm and at most 20 µm, particularly preferably at least 3 µm and at most 10 µm.

Further, the thickness of the acrylic primer layer in the final resin substrate provided with a hard coating film of the present invention after formation of the silicone type hard coating layer and the middle layer is completed, is preferably at least 0.1 µm and at most 10 µm, particularly preferably at least 2 µm and at most 8 µm.

(4) Hard Coating Layer

The resin substrate provided with a hard coating film of the present invention comprises the above middle layer on the primer layer containing the acrylic polymer as the main component formed on at least one side of the resin substrate, and on the middle layer, a hard coating layer containing a cured product of an organopolysiloxane as the main component.

As described above, the middle layer is not formed by itself, but is formed at the same time as formation of the hard coating layer described below.

(4-1) Organopolysiloxane

The hard coating layer in the present invention contains a cured product of an organopolysiloxane as the main component, and as the organopolysiloxane forming the cured product, any curable organopolysiloxane may be used without any particular restriction.

Organopolysiloxanes are composed of silicon-containing bond units so-called M units, D units, T units or Q units. Among them, a curable organopolysiloxane is an oligomer-form polymer composed mainly of T units or Q units, and it may be a polymer composed solely of T units, a polymer composed solely of Q units, or a polymer composed of T units and Q units.

Further, such polymers may contain a small amount of M units or D units.

In a curable organopolysiloxane, a T unit is a unit having one silicon atom, one hydrogen atom or monovalent organic group bonded to the silicon atom, and three oxygen atoms bonded to other silicon atoms or functional groups which can be bonded to other silicon atoms. The monovalent organic group bonded to the silicon atom is a monovalent organic group wherein the atom bonded to the silicon atom is a carbon atom. The functional groups which can be bonded to other silicon atoms are hydroxy groups or groups which can be converted to hydroxy groups by hydrolysis (hereinafter referred to as hydrolyzable groups). The sum of the oxygen atoms bonded to other silicon atoms and the functional groups which can be bonded to other silicon atoms, is 3, and T units are classified into three types of units so-called T1, T2 and T3, depending upon the difference in number of the oxygen atoms bonded to other silicone atoms and the functional groups which can be bonded to other silicon atoms. In T1, the number of oxygen atoms bonded to other silicon atoms is 1, in T2, the number of such oxygen atoms is 2, and in T3, the number of such oxygen atoms is 3. In this specification, etc., an oxygen atom bonded to another silicon atom is represented by O*, and a monovalent functional group which can be bonded to another silicon atom is represented by Z.

Here, O* representing an oxygen atom bonded to another silicon atom, is an oxygen atom linking two silicon atoms and is an oxygen atom in a bond represented by Si—O—Si. Accordingly, O* is one present between silicon atoms of two silicon-containing bond units. In other words, O* represents an oxygen atom shared between two silicon atoms of two silicon-containing bond units. In the after-mentioned chemical formulae of the silicon-containing bond units, O* is represented as bonded to one silicon atom, but this O* is an oxygen atom shared by a silicon atom of another silicon-containing bond unit and does not mean that two silicon-containing bond units are bonded by a bond represented by Si—O*—O*—Si.

The above-mentioned M unit is a unit having three such organic groups and one O*; the D unit is a unit having two such organic groups and two O* (or one O*1 and one Z group); and the Q unit is a unit having no such an organic group and 4 O* (or a total of 4 i.e. from 1 to 3 O* and from 3 to 1 Z group). Each silicon-containing bond unit is formed from a compound having no oxygen atom (O*) bonded to another silicon atom (having only Z groups) (hereinafter sometimes referred to as a monomer). A monomer to form a T unit will be referred to as a T monomer. A monomer to form a M unit, a D unit or a Q unit may likewise be referred to as a M monomer, a D monomer or a Q monomer.

The monomer is represented by (R'—)$_a$Si(—Z)$_{4-a}$, wherein a is an integer of from 0 to 3, R' is a hydrogen atom or a monovalent organic group, and Z is a hydroxy group or a monovalent functional group which can be bonded to another silicon atom. In this chemical formula, a compound wherein a=3 is the M monomer; a compound wherein a=2 is the D monomer; and a compound wherein a=1 is the T monomer; and a compound wherein a=0, is the Q monomer. In such monomers, the Z group is usually a hydrolyzable group. Further, in a case where 2 or 3 R' were present (in a case where a is 2 or 3), a plurality of R' may be different. R' is preferably one within the same scope as the after-mentioned preferred R.

A curable organopolysiloxane can be obtained by a reaction to convert some of Z groups in a monomer to O*. In a case where the organopolysiloxane is a copolymer comprising two or more silicon-containing bond units, such a copolymer is usually obtainable from a mixture of the respectively corresponding monomers. In a case where Z groups in a monomer are hydrolyzable groups, the Z groups are converted to hydroxy groups by a hydrolysis reaction, and then, by a dehydration condensation reaction between two hydroxy groups bonded to separate silicon atoms, the two silicon atoms will be linked via an oxygen atom (O*). In the curable organopolysiloxane, hydroxy groups (or non-hydrolyzed Z groups) remain, and at the time of curing of such a curable organopolysiloxane, such hydroxy groups or Z groups are reacted in the same manner as described above, for curing. The cured product of the curable organopolysiloxane is a three dimensionally crosslinked polymer, and a cured product of a curable organopolysiloxane having many T units or Q units will be a cured product having a high crosslink density. At the time of curing, Z groups of a curable organopolysiloxane are converted to O*, but it is considered that some of Z groups (particularly hydroxy groups) will remain, so that the cured product will have hydroxy groups. In a case where a curable organopolysiloxane is cured at a high temperature, there may be a case where no substantial hydroxy groups will remain in the cured product.

In a case where Z groups in a monomer are hydrolyzable groups, such Z groups may, for example, be alkoxy groups, chlorine atoms, acyloxy groups or isocyanate groups. In many cases, as a monomer, a monomer wherein Z groups are alkoxy groups, is used. Alkoxy groups are hydrolyzable groups having a relatively low reactivity as compared with e.g. chlorine atoms, and in a curable organopolysiloxane obtainable by using a monomer wherein Z groups are alkoxy groups, unreacted alkoxy groups are present together with hydroxy groups, as Z groups, in many cases. In a case where Z groups in a monomer are hydrolyzable groups having a relatively high reactivity (such as chlorine atoms), most of Z groups in a curable organopolysiloxane obtainable by using such a monomer will be hydroxy groups. Therefore, in a usual curable organopolysiloxane, Z groups in the respective units constituting it are hydroxy groups, or hydroxy groups and alkoxy groups, in many cases.

In the present invention, among such curable organopolysiloxanes, a curable organopolysiloxane composed of T units as the main silicon-containing bond units is preferably used. Hereinafter, a curable organopolysiloxane will be referred to simply as an organopolysiloxane unless otherwise specified. Here, in this specification, the organopolysiloxane composed of T units as the main constituting units (hereinafter referred to as "organopolysiloxane (T)" as the case requires) is an organopolysiloxane wherein the proportion in number of T units is from 50 to 100% to the total number of M units, D units, T units and Q units, and in the present invention, more preferably an organopolysiloxane wherein the proportion of T units is from 70 to 100%, particularly preferably an organopolysiloxane wherein the proportion of T units is from 90 to 100% is used. Further, as other units contained in a small amount in addition to T units, D units and Q units are preferred, and Q units are particularly preferred.

That is, in the present invention, among such curable organopolysiloxanes, an organopolysiloxane composed solely of T units and Q units, their proportion in number T:Q being 90 to 100:10 to 0, is particularly preferably used.

The proportions in number of M units, D units, T units and Q units in the organopolysiloxane can be calculated from values of peak area ratios by $^{29}$Si-NMR.

The organopolysiloxane (T) preferably used in the present invention is an organopolysiloxane having T units represented by the following T1 to T3.

  T1:

  T2:

  T3:

(wherein R is a hydrogen atom or a $C_{1-10}$ substituted or unsubstituted monovalent organic group, X is a hydrogen atom or a $C_{1-6}$ alkyl group, and O* is an oxygen atom linking two silicon atoms.)

In the above chemical formulae, R is not limited to one type, and each of T1, T2 and T3 may contain plural types of R. Further, in the above chemical formulae, —OX is a hydroxy group or an alkoxy group. Between T1 and T2, —OX may be the same or different. Two —OX in T2 may be different, and for example, one of them may be a hydroxy group and the other may be an alkoxy group. Further, when the two —OX are alkoxy groups, such alkoxy groups may be different alkoxy groups. However, as described hereinafter, the two alkoxy groups are usually the same alkoxy groups.

Further, a T unit having three —OX only without having an oxygen atom (O*) linking two silicon atoms, will be hereinafter referred to as T0. Actually, T0 corresponds to an unreacted T monomer contained in the organopolysiloxane and is not a silicon-containing bond unit. Such a T0 is measured in the same manner as T1 to T3 in the analysis of T1 to T3 units.

T0 to T3 in the organopolysiloxane can be analyzed by measuring the bonding states of silicon atoms in the organopolysiloxane by a nuclear magnetic resonance analysis ($^{29}$Si-NMR). The ratios in number of T0 to T3 are obtained from the peak area ratios in $^{29}$Si-NMR. —OX in the organopolysiloxane molecule can be analyzed by an infrared absorption analysis. The ratios in number of hydroxy groups and alkoxy groups bonded to silicon atoms can be obtained from the peak area ratios of the infrared absorption peaks of the two. The mass average molecular weight Mw, the number average molecular weight Mn and the dispersion degree Mw/Mn of the organopolysiloxane are values measured by using polystyrene as a standard substance by a gel permeation chromatography method. Such properties of an organopolysiloxane are not meant for the properties of a single molecular, but are obtained as average properties of the respective molecules.

A plurality of T1, T2 or T3 present in one molecule of the organopolysiloxane (T) may be two or more different types. For example, there may be two or more T2 different in R. Such an organopolysiloxane is obtainable from a mixture of two or more T monomers. For example, it is considered that in an organopolysiloxane obtainable from a mixture of two or more T monomers different in R, two or more T1, T2 and T3, respectively, different in R are present. The ratio in number of different R in an organopolysiloxane obtained from a mixture of a plurality of T monomers different in R, reflects the compositional ratio in the mixture of the T monomers different in R. However, the ratio in number of units different in R in each of T1, T2 and T3 does not necessarily reflect the compositional ratio in the mixture of the T monomers different in R, because, for example, even if three —OX in the T monomers are the same, the reactivities of the T monomers, T1 and T2 may be different due to the difference in R.

The organopolysiloxane (T) is preferably produced from at least one type of T monomers represented by R—Si(—OY)$_3$. In this formula, R is the same as the above-described R, and Y is a $C_{1-6}$ alkyl group. Y may be not only an unsubstituted alkyl group but also a substituted alkyl group such as an alkoxy-substituted alkyl group. Three Y in one molecule may be different. However, the three Y are usually the same alkyl group. Y is preferably an alkyl group having from 1 to 4 carbon atoms, more preferably 1 or 2 carbon atoms. Specifically, Y may, for example, be a methyl group, an ethyl group, a n-propyl group, a n-butyl group, a t-butyl group or a 2-methoxyethyl group.

R is a hydrogen atom or a $C_{1-10}$ substituted or unsubstituted monovalent organic group. The organic group is meant for an organic group wherein, as mentioned above, atoms bonded to silicon atoms are carbon atoms.

The unsubstituted monovalent organic group may be a hydrocarbon group such as an alkyl group, an alkenyl group, an alkynyl group, a cycloalkyl group, an aryl group or an aralkyl group. Such a hydrocarbon group is preferably a $C_{1-10}$ alkyl group, a $C_{2-10}$ alkenyl or alkynyl group, a $C_5$ or $C_6$ cycloalkyl group, a $C_{6-10}$ aryl group or a $C_{7-10}$ aralkyl group. Specifically, a methyl group, an ethyl group, a n-propyl group, a n-butyl group, an i-butyl group, a t-butyl group, a hexyl group, an octyl group, a decyl group, a vinyl group, an allyl group, a cyclohexyl group, a phenyl group, a benzyl group or a phenethyl group, may, for example, be mentioned.

The substituted monovalent organic group may, for example, be a hydrocarbon group having a hydrogen atom of a ring of e.g. a cycloalkyl group, an aryl group or an aralkyl group substituted by an alkyl group, or a substituted organic group having a hydrogen atom of the above mentioned hydrocarbon group substituted by e.g. a halogen atom, a functional group or a functional group-containing organic group. As the functional group, a hydroxy group, a mercapto group, a carboxy group, an epoxy group, an amino group or a cyano group may, for example, be preferred. As a halogen atom-substituted organic group, an alkyl group having a chlorine atom or a fluorine atom, such as a chloroalkyl group or a polyfluoroalkyl group, is preferred. As the functional group-containing organic group, an alkoxy group, an acyl group, an acyloxy group, an alkoxycarbonyl group, a glycidyl group, an epoxycyclohexyl group, an alkylamino group, a dialkylamino group, an arylamino group or an N-aminoalkyl-substituted aminoalkyl group is, for example, preferred. Particularly preferred is a chlorine atom, a mercapto group, an epoxy group, an amino group, an acryloyloxy group, a methacryloyloxy group, a glycidyl group, an alkylamino group or an N-aminoalkyl-substituted aminoalkyl group. A T monomer having a substituted organic group which is substituted by e.g. a functional group or a functional group-containing organic group, includes a compound in a category so-called a silane coupling agent.

As specific examples of the substituted organic group, the following organic groups may be mentioned: a 3-chloropropyl group, a 3,3,3-trifluoropropyl group, a 3-mercaptopropyl group, a p-mercaptomethylphenylethyl group, a 3-acryloyloxypropyl group, a 3-methacryloyloxypropyl group, a 3-glycidoxypropyl group, a 2-(3,4-epoxycyclohexyl)ethyl group, a 3-aminopropyl group, an N-phenyl-3-aminopropyl group, an N-(2-aminoethyl)-3-aminopropyl group, and a 2-cyanoethyl group.

As the above R, a particularly preferred monovalent organic group is a $C_{1-4}$ alkyl group. The organopolysiloxane (T) is preferably an organopolysiloxane which is obtainable by using one or more of T monomers each having a $C_{1-4}$ alkyl group. Further, the organopolysiloxane (T) is also preferably an organopolysiloxane which is obtainable by using at least one of T monomers each having a $C_{1-4}$ alkyl group and a small amount of another T monomer. The proportion of such another T monomer is preferably at most 30 mol %, particularly preferably at most 15 mol %, based on the total amount of T monomers. As such another T monomer, preferred is a T monomer having a substituted organic group which is substituted by a functional group or a functional group-containing organic group, in a category so-called a silane coupling agent.

Specifically, a T monomer having a $C_{1-4}$ alkyl group may, for example, be methyltrimethoxysilane, methyltriethoxysilane, methyltripropoxysilane, ethyltrimethoxysilane or ethyltriethoxysilane. Particularly preferred is methyltrimethoxysilane or ethyltrimethoxysilane. As specific examples of a T monomer having a substituted organic group or the like, the following compounds may, for example, be mentioned.

Vinyltrimethoxysilane, vinyltriethoxysilane, phenyltrimethoxysilane, phenyltriethoxysilane, 3-chloropropyltrimethoxysilane, 3,3,3-trifluoropropyltrimethoxysilane, 3-mercaptopropyltrimethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-acryloyloxypropyltrimethoxysilane, 3-methacryloyloxypropyltrimethoxysilane, 3-aminopropyltrimethoxysilane, 3-aminopropyltriethoxysilane, N-(2-aminoethyl)-3-aminopropyltrimethoxysilane and 3-cyanoethyltrimethoxysilane.

A T monomer represented by $(R'—)_a Si(—Z)_{4-a}$ (a=3) other than the T monomer represented by R—Si(—OY)$_3$, may, for example, be methyltrichlorosilane, ethyltrichlorosilane, phenyltrichlorosilane, 3-glycidoxypropyltrichlorosilane, methyltriacetoxysilane or ethyltriacetoxysilane.

In a D monomer represented by $(R'—)_a Si(—Z)_{4-a}$ (a=2), the two R' may be the same or different. In a case where they are the same, they are preferably a $C_{1-4}$ alkyl group. In a case where they are different, it is preferred that one R' is a $C_{1-4}$ alkyl group, and the other R' is a substituted organic group which is substituted by the above mentioned functional group or functional group-containing organic group. Further, the Z group is preferably a $C_{1-4}$ alkoxy group, an acetoxy group or the like. As the D monomer, the following compounds may, for example, be mentioned.

Dimethyldimethoxysilane, dimethyldiethoxysilane, vinylmethyldimethoxysilane, vinylmethyldiethoxysilane, phenylmethyldimethoxysilane, phenylmethyldiacetoxysilane, 3-chloropropylmethyldimethoxysilane, 3,3,3-trifluoropropylmethyldimethoxysilane, 3-mercaptopropylmethyldiethoxysilane, 3-acryloyloxypropylmethyldimethoxysilane, 3-methacryloyloxypropylmethyldimethoxysilane, 3-aminopropylmethyldimethoxysilane, 3-aminopropylmethyldiethoxysilane, N-(2-aminoethyl)-3-aminopropylmethyldimethoxysilane and 3-cyanoethylmethyldimethoxysilane.

In a Q monomer represented by $(R'—)_a Si(—Z)_{4-a}$ (a=0), the four Z groups may be different, but they are usually the same. The Z group is preferably a $C_{1-4}$ alkoxy group, particularly preferably a methoxy group or an ethoxy group. As the Q monomer, the following compounds may, for example, be mentioned.

Tetramethoxysilane, tetraethoxysilane, tetra n-propoxysilane, tetra n-butoxysilane, tetra sec-butoxysilane and tetra t-butoxysilane.

The organopolysiloxane (T) to be used in the present invention can be obtained by subjecting the above T monomer or the like to partial hydrolytic condensation. Usually, this reaction is carried out by heating the T monomer or the like and water in a solvent. It is preferred that a catalyst is present in the reaction system. The desired organopolysiloxane can be produced by adjusting the reaction conditions such as the type of the monomer, the amount of water, the heating temperature, the type and amount of the catalyst, the reaction time, etc. In some cases, a commercially available organopolysiloxane may be used as the desired organopolysiloxane as it is, or the desired organopolysiloxane may be produced by using a commercially available organopolysiloxane.

The above catalyst is preferably an acid catalyst. The acid catalyst may, for example, be an inorganic acid such as hydrochloric acid, sulfuric acid, nitric acid, phosphoric acid, nitrous acid, perchloric acid or sulfamic acid, or an organic acid such as formic acid, acetic acid, propionic acid, butyric acid, oxalic acid, succinic acid, maleic acid, lactic acid or p-toluenesulfonic acid. Particularly preferred is acetic acid. The above solvent is preferably a hydrophilic organic solvent, particularly preferably an alcohol type solvent. The alcohol type solvent may, for example, be methanol, ethanol, 1-propanol, 2-propanol, 1-butanol, 2-butanol, 2-methyl-1-propanol, 2-ethoxyethanol, 4-methyl-2-pentanol or 2-buthoxyethanol. With respect to the reaction temperature, in a case where a catalyst is present, the reaction can be made at ordinary temperature. Usually, within a reaction temperature of from 20 to 80° C., a suitable temperature is selected for use depending upon the particular purpose.

The hydrolytic condensation reaction is a reaction whereby T1 is formed from T0 (T monomer), T2 is formed from T1, and T3 is formed from T2. The reaction rate is considered to be low in the order of the condensation reaction whereby T1 is formed from T0 having at least one hydrolyzable group converted to a hydroxy group, a condensation reaction whereby T2 is formed from T1 wherein at least one of the two —OX is hydroxy group, and a condensation reaction whereby T3 is formed from T2 wherein —OX is a hydroxy group. Also in consideration of a hydrolysis reaction of a hydrolyzable group, it is considered that the peak of the amount of each unit to be present moves from T0 to T3 as the reaction proceeds. In a case where the reaction conditions are relatively mild, it is considered that the movement of the peak of the amount present proceeds relatively steadily. On the other hand, in a case where the reaction conditions are relatively vigorous, the reaction proceeds randomly, whereby the distribution of the amount of each unit present tends to be flat, and the amount of T0 or T1 present tends to be large as compared with the amount of T2 or T3 present. As described hereinafter, the organopolysiloxane (a) among the organopolysiloxanes to be used in the present invention is an organopolysiloxane having a relatively high molecular weight wherein the amount of T0 or T1 present is small, and the ratio in the amount present of T2 to T3 is in a specific range, and such an organopolysiloxane can be produced by selecting relatively mild reaction conditions.

The reactivity for the above condensation reaction changes depending on R, and if R differs, the reactivity of a hydroxy group also changes. Usually, as R becomes small (for example, in a case where R is an alkyl group, as the number of carbon atoms in the alkyl group becomes small), the reactivity of a hydroxy group becomes high. Accordingly, it is preferred to select the T monomer taking into consideration the relation between the reactivity of the hydrolyzable group and the reactivity of the hydroxy group.

Further, the rate of the hydrolysis reaction of a hydrolyzable group to a hydroxy group changes depending upon the type of the hydrolyzable group, and it is preferred to take into consideration the relation with the rate of the condensation reaction. For example, in a case where an OX group in T2 is an alkoxy group, if its hydrolysis reaction rate is too slow, T2 wherein the OX group is a hydroxy group becomes less. Likewise, if the hydrolysis reaction rate is too slow, T1 wherein the OX group is a hydroxy group becomes less. Therefore, it becomes difficult to obtain an organopolysiloxane wherein the ratio in amount of the hydroxy group to the alkoxy group is high. Accordingly, the alkoxy group being an OX group is preferably an alkoxy group having a high reactivity i.e. an alkoxy group having a small number of carbon atoms, and a methoxy group is most preferred. In a case where the reactivity of a hydrolyzable group is sufficiently high, it is possible to obtain an organopolysiloxane having a high proportion of hydroxy groups from an organopolysiloxane having a high proportion of hydrolyzable groups without proceeding with the condensation reaction so much.

The hard coating layer in the resin substrate provided with a hard coating film of the present invention may contain a cured product formed by using only one type of the curable organopolysiloxane (T) thus obtained as the main component or may contain a cured product formed by using two or more in combination as the main component. For the resin substrate provided with a hard coating film of the present invention, to form the hard coating layer, a composition containing materials of components constituting the hard coating layer before curing (hereinafter referred to as "hard coating composition"), which is commonly used, is prepared and used. The curable organopolysiloxane (T) to be preferably used in the present invention can also be contained as its cured product in the hard coating layer obtainable, by blending it with such a hard coating composition in the production step.

As a particularly preferred combination of organopolysiloxanes (T) from the viewpoint of the abrasion resistance and the weather resistance, a combination of an organopolysiloxane (a) and an organopolysiloxane (b) will be described below. However, the curable organopolysiloxane to be used in the present invention is not limited thereto. Further, each of the organopolysiloxane (a) and the organopolysiloxane (b) may be used by itself as the organopolysiloxane (T) in the present invention.

(Organopolysiloxane (a))

An organopolysiloxane (a) contains the respective units T1 to T3 in a ratio of T1:T2:T3=0-5:15-40:55-85 and in a ratio of T3/T2=1.5-4.0. Further, with respect to OX groups in the organopolysiloxane (a), the ratio of the number (B) of them being hydroxy groups to the number (A) of them being alkoxy groups i.e. (B)/(A) is at least 12.0 on molecular average. And, the mass average molecular weight of the organopolysiloxane (a) is from 800 to 8,000.

Further, the organopolysiloxane (a) does not substantially contain T0 as a T monomer.

With respect to the proportions of T1, T2 and T3 constituting the organopolysiloxane (a), in addition to the above conditions, (T2+T3)/(T1+T2+T3) is preferably within a range of from 0.85 to 1.00, more preferably from 0.90 to less than 1.00. Further, with respect to T3/T2, a preferred range is from 2.0 to 4.0.

By adjusting the proportions of T1, T2 and T3 constituting the organopolysiloxane (a) to be in such ranges in an average composition of the respective molecules, it becomes possible that when the organopolysiloxane (a) is combined with the after-described organopolysiloxane (b) to form a hard coating composition to form the hard coating layer of the present invention, the abrasion resistance and weather resistance of the hard coating layer obtainable by curing can be improved.

The ratio of (B)/(A) in the organopolysiloxane (a) is a parameter indicating the condensation reactivity, and if this value becomes large, i.e. if the proportion of hydroxy groups becomes high as compared with alkoxy groups, the curing reaction at the time of forming a hard coating layer will be accelerated when the organopolysiloxane (a) and the organopolysiloxane (b) are combined and used as a hard coating composition. Further, alkoxy groups which remain to be unreacted at the time of forming the hard coating layer, are likely to lead to deterioration of the abrasion resistance of the hard coating layer and may cause microcracks if post curing proceeds, and therefore, the proportion of hydroxy groups should better be high as compared with alkoxy groups. The ratio of (B)/(A) in the organopolysiloxane (a) is at least 12.0, preferably at least 16.0. Further, (A) may be 0.

If the value of (B)/(A) is less than 12.0, the proportion of hydroxy groups tends to be too low as compared with alkoxy groups, whereby the effect to accelerate the curing reaction tends to be hardly obtainable, and by the influence of alkoxy groups, deterioration of the abrasion resistance is likely to be led, or post curing is likely to proceed to cause micro cracks. That is, if the value of (B)/(A) is less than 12.0, at the time of forming a hard coating layer, a part of the organopolysiloxane (a) may not be included in the three dimensional crosslink structure (network) formed by the curing reaction of the organopolysiloxane (a) and the organopolysiloxane (b) and is likely to bleed out, thus causing problems such that the crosslinking density decreases, the abrasion resistance cannot be obtained, and the curing tends to hardly proceed.

The mass average molecular weight of the organopolysiloxane (a) is from 800 to 8,000, preferably from 1,000 to 6,000. As the mass average molecular weight of the organopolysiloxane (a) is within this range, it is possible that when the organopolysiloxane (a) and the organopolysiloxane (b) are used in combination for a hard coating composition to form the hard coating layer of the present invention, it is possible to improve the abrasion resistance and weather resistance of the obtainable hard coating layer.

In the present invention, in order to obtain an organopolysiloxane (a) to be used for a hard coating composition to form a hard coating layer excellent particularly in the abrasion resistance, it is preferred to use a raw material hydrolyzable silane compound wherein at least 70 mass % of all T monomers is a methyl trialkoxysilane, wherein the number of carbon atoms of the alkoxy groups is from 1 to 4. However, for the purpose of improving the adhesion or providing functions such as hydrophilicity, water repellency, etc. T monomers other than the methyl trialkoxysilane may be used in combination in a small amount.

As a method for producing the organopolysiloxane (a) as mentioned above, the T monomer or the like is subjected to a hydrolytic condensation reaction in a solvent in the presence of an acid catalyst. Here, water required for the hydrolysis is usually from 1 to 10 equivalents, preferably from 1.5 to 7 equivalents, more preferably from 3 to 5 equivalents, per 1 equivalent of the monomer. The hydrolysis and condensation of the monomer can be carried out in a reaction system where a colloidal silica (as described hereinafter) is present, and in a case where an aqueous dispersion type colloidal silica is used as such a colloidal silica, water is supplied from such an aqueous dispersion. The amount of the acid catalyst to be used is preferably from 0.1 to 50 parts by mass, particularly preferably from 1 to 20 parts by mass, per 100 parts by mass of the monomer. As the solvent, the above-mentioned alcohol type solvent is preferred, and specifically, methanol, ethanol, 2-propanol, 1-butanol or 2-butanol is particularly preferred from such a viewpoint that the solubility of the obtainable organopolysiloxane (a) will be good.

Usually, the reaction temperature is from 20 to 40° C., and the reaction time is from 1 hour to a few days. The hydrolytic condensation reaction of the monomer is an exothermic reaction, but the temperature of the system should better not exceed 60° C. It is preferred that under such conditions, the hydrolysis reaction is sufficiently proceeded, and then for the stability of the obtainable organopolysiloxane, the condensation reaction is proceeded at a temperature of from 40 to 80° C. for from 1 hour to a few days.

The organopolysiloxane (a) may also be produced from a commercially available organopolysiloxane. A commercially available organopolysiloxane is usually an organopolysiloxane wherein the proportion of alkoxy groups is high as compared with hydroxy groups, and accordingly, it is preferred that by using a commercially available organopolysiloxane similar to the desired organopolysiloxane (a) except for the ratio of (B)/(A), the proportion of hydroxy groups is increased by a hydrolysis reaction to produce the organopolysiloxane (a).

A commercially available organopolysiloxane useful as a raw material for the organopolysiloxane (a), may, for example, be the following organopolysiloxane which is a partial hydrolytic condensation product of methyltrimethoxysilane. Here, the symbol "ND" means that when the peak area ratio of $^{29}$Si-NMR is measured by means of nuclear magnetic resonance analyzer ECP400 (tradename) manufactured by JEOL Ltd., the result is not more than a detectable level (the same applies hereinafter).

Methyl type silicone resin KR-220L (tradename, manufactured by Shin-Etsu Chemical Co., Ltd.); T0:T1:T2:T3=ND: ND:28:72, Si—OH/SiO—$CH_3$=11.7, mass average molecular weight Mw=4,720, number average molecular weight Mn=1,200, Mw/Mn=3.93.

Methyl type silicone resin KR-500, (tradename, manufactured by Shin-Etsu Chemical Co., Ltd.); T0:T1:T2:T3=ND: 15:58:27, the peak attributable to the Si—OH group is not detected by FT-IR, substantially only SiO—$CH_3$ is present. Mw=1,240, Mn=700, Mw/Mn=1.77.

In a case where an organopolysiloxane (a) is produced from such a commercially available organopolysiloxane, it is preferred to subject the commercially available organopolysiloxane to mainly the hydrolysis of alkoxy groups in the presence of an acid catalyst. For example, a method may be mentioned wherein to the commercially available organopolysiloxane, a solvent in an amount of from 0 to 10 times (by mass) is added and thoroughly mixed, and then an aqueous acid solution at a concentration of from about 0.1 to 70 mass % is added, followed by stirring at a temperature of from 15 to 80° C., preferably from 20 to 70° C., for from 1 to 24 hours. As the solvent to be used, water may be used, or the above mentioned alcohol type solvent having water added thereto, may also be used.

(Organopolysiloxane (b))

The organopolysiloxane (b) used in combination with the above organopolysiloxane (a) for the hard coating composition to form the hard coating layer of the present invention, is an organopolysiloxane having a mass average molecular weight between 1/10 and 1/1.5 of the mass average molecular weight of the organopolysiloxane (a). The organopolysiloxane (b) is an organopolysiloxane having a mass average molecular weight smaller than the organopolysiloxane (a) to be combined and has the above-described units T1 to T3. The ratio in number of T1:T2:T3, the ratio of T3/T2 and the ratio of (B)/(A) are not particularly limited.

The mass average molecular weight of the organopolysiloxane (b) is preferably between 1/8 and 1/1.5 of the mass average molecular weight of the organopolysiloxane (a) to be combined. If the mass average molecular weight of the organopolysiloxane (b) exceeds 1/1.5 of the mass average molecular weight of the organopolysiloxane (a), i.e. if the mass average molecular weight of the organopolysiloxane (a) is less than 1.5 times the mass average molecular weight of the organopolysiloxane (b), the toughness of the obtainable hard coating layer tends to be low, and such becomes a cause to form cracks. Further, if the mass average molecular weight of the organopolysiloxane (b) is less than 1/10 of the mass average molecular weight of the organopolysiloxane (a), i.e. if the mass average molecular weight of the organopolysiloxane (a) exceeds ten times the mass average molecular weight of the organopolysiloxane (b), the abrasion resistance of the obtainable hard coating layer tends to be low, whereby it becomes difficult to obtain a hard coating layer having sufficient abrasion resistance.

A more preferred organopolysiloxane (b) is an organopolysiloxane wherein the respective silicon-containing bond units represented by T0, T1, T2 and T3 are within a range of T0:T1:T2:T3=0-5:0-50:5-70:10-90, in a ratio by number of such units. The proportions of T0 and T1 in the organopolysiloxane (b) being large usually indicates that at the time of producing such an organopolysiloxane, the hydrolysis reaction or the condensation reaction of the raw material monomer was insufficient. In the organopolysiloxane (b), if the proportions of T0 and T1 are large, at the time of heat curing to form a hard coating layer by using a hard coating composition comprising it and the organopolysiloxane (a), formation of cracks tends to increase. Further, usually, if the condensation reaction of the raw material monomer is proceeded too much at the time of producing an organopolysiloxane, the proportion of T3 in the obtainable organopolysiloxane tends to be high. In the organopolysiloxane (b), if the proportion of T3 becomes higher than necessary, a proper crosslinking reaction tends to be difficult at the time of heat curing to form a hard coating layer by using the hard coating composition comprising it and the organopolysiloxane (a), whereby the hard coating layer may not be formed, or it becomes difficult to obtain a hard coating layer having sufficient abrasion resistance.

The organopolysiloxane (b) can be produced from a T monomer or the like in the same manner as the organopolysiloxane (a). Further, a commercially available organopolysiloxane may be used as it is, as the organopolysiloxane (b). The following organopolysiloxanes may, for example, be mentioned as commercially available organopolysiloxanes which can be used as the organopolysiloxane (b). Here, the symbol "trace" means that when the peak area ratio of $^{29}$Si-NMR is measured by means of a nuclear magnetic resonance analyzer ECP400 (tradename) manufactured by JEOL Ltd., it is at least 0.01 and at most 0.25 (the same applies hereinafter).

TOSGUARD 510 (tradename, manufactured by Momentive Performance Materials, Inc.); molecular weight: Mn=1, 370, Mw=1,380, Mw/Mn=1.01. Number of T units: (total amount of the respective numbers of M units, D units and Q units)=at least 99.9:ND. T0:T1:T2:T3=ND:2:36:62.

KP851 (tradename: manufactured by Shin-Etsu Chemical Co., Ltd.); molecular weight: Mn=1,390, Mw=1,400, Mw/Mn=1.01. Number of T units: (total amount of the respective numbers of M units, D units and Q units)=at least 99.9:ND. T0:T1:T2:T3=trace:21:58:21.

Further, the ratio in content of the organopolysiloxane (b) to the organopolysiloxane (a) in the after-mentioned hard coating composition to form the hard coating layer of the present invention is preferably from 1.5 to 30 times, more preferably from 2 to 15 times, by mass ratio. When the hard coating composition to form the hard coating layer of the present invention contains components (a) and (b) in such a ratio, the three dimensional crosslinking structure of organopolysiloxanes formed by the curing reaction will be one having the organopolysiloxane component (a) partially incorporated in the three dimensional crosslinking structure composed mainly of the organopolysiloxane (b), whereby the weather resistance and abrasion resistance of an obtainable hard coating layer will be good.

(4-2) Hard Coating Composition

To form the hard coating layer of the resin substrate provided with a hard coating film of the present invention, and to form the middle layer at the same time, in the present invention, a hard coating composition containing the above curable organopolysiloxane, preferably the organopolysiloxane (T) is used. The content of the organopolysiloxane in the hard coating composition is preferably from 50 to 100 mass %, more preferably from 60 to 95 mass %, based on the total amount of the composition excluding the solvent (hereinafter referred to as "the nonvolatile component" as the case requires). In this specification, the nonvolatile component is mass % calculated on the basis of a change in mass after the hard coating composition being left at 150° C. for 45 minutes Further, in order to form the middle layer, in the present invention, the pH of the hard coating composition is adjusted, and a specific method is as described hereinafter.

The hard coating composition to be used in the present invention may contain various additives in addition to the above organopolysiloxanes. For example, in order to further improve the abrasion resistance of the hard coating layer of the resin substrate provided with a hard coating film of the present invention, the hard coating layer preferably contains fine silica particles, and therefore, a hard coating composition containing fine silica particles is preferably used. To blend fine silica particles with the hard coating composition, specifically, it is preferred to incorporate colloidal silica. Here, the colloidal silica is meant for one having fine silica particles dispersed in water or an organic solvent such as methanol, ethanol, isobutanol or propylene glycol monomethyl ether.

Otherwise, fine silica particles may be incorporated to the raw material monomer in a step of producing the organopolysiloxane. By producing the organopolysiloxane in a reaction system containing colloidal silica, it is possible to obtain the organopolysiloxane containing fine silica particles. For example, by adding a T monomer and, if required, water or an acid catalyst, to colloidal silica, it is possible to produce the organopolysiloxane as described above in the dispersion of colloidal silica. By using the organopolysiloxane thus obtained, it is possible to produce a hard coating composition of the present invention containing fine silica particles.

The fine silica particles to be used for the hard coating composition of the present invention preferably has an average particle size (BET method) of from 1 to 100 nm. If the average particle size exceeds 100 nm, the particles will diffusely reflect light, whereby the haze value of the obtainable hard coating layer tends to be large, such being undesirable from the viewpoint of the optical quality. Further, the average particle size is particularly preferably from 5 to 40 nm, whereby the transparency of the hard coating layer can be maintained while imparting the abrasion resistance to the hard coating layer. Further, the colloidal silica may be used in either in a water-dispersed type or an organic solvent-dispersed type, but it is preferred to use a water-dispersed type. Further, it is particularly preferred to use colloidal silica dispersed in an acidic aqueous solution. Further, to the colloidal silica, fine inorganic particles other than fine silica particles, such as alumina sol, titanium sol or ceria sol, may be incorporated.

The content of the fine silica particles in the hard coating composition to be used in the present invention is preferably from 1 to 50 mass %, more preferably from 5 to 40 mass %, based on the total amount of the composition excluding the solvent (the non-volatile component). If the content of the fine silica particles in the non-volatile component in the hard coating composition to be used in the present invention is less than 1 mass %, adequate abrasion resistance may not be secured in the obtainable hard coating layer, and if the content exceeds 50 mass %, the proportion of organopolysiloxanes in the non-volatile component tends to be too low, whereby it tends to be difficult to form a hard coating layer by heat curing of the organopolysiloxanes, cracking is likely to be formed in the obtainable hard coating layer, or aggregation of fine silica particles is likely to take place to deteriorate the transparency of the hard coating layer.

The hard coating composition to be used in the present invention may further contain an additive such as a defoaming agent or a viscosity-adjusting agent for the purpose of improving the coating properties, may contain an additive such as an adhesion-imparting agent for the purpose of improving the adhesion, or may contain a leveling agent as an additive for the purpose of improving the coating properties and the smoothness of the coating film thereby obtainable. The amounts of such additives to be incorporated are preferably from 0.01 to 2 parts by mass of each additive, based on 100 parts by mass of the organopolysiloxane. Further, the hard coating composition to be used in the present invention may contain a dye, a pigment, a filler, etc. within a rage not to impair the purpose of the present invention.

The hard coating composition to be used in the present invention may further contain a curing catalyst. The curing catalyst may, for example, be an alkali metal salt such as a lithium salt, a sodium salt or a potassium salt, of an aliphatic carboxylic acid (such as formic acid, acetic acid, propionic acid, butyric acid, lactic acid, tartaric acid or succinic acid); a quaternary ammonium salt such as a benzyltrimethylammonium salt, a tetramethylammonium salt or a tetraethylammonium salt; a metal alkoxide or chelate of e.g. aluminum, titanium or cerium; ammonium perchlorate, ammonium chloride, ammonium sulfate, sodium acetate, an imidazole or its salt, ammonium trifluoromethyl sulfonate, or bis(trifluoromethylsulfonyl)bromomethyl ammonium. Here, the amount of the curing catalyst to be incorporated is preferably from 0.01 to 10 parts by mass, more preferably from 0.1 to 5 parts by mass, per 100 parts by mass of the organopolysiloxane. If the content of the curing catalyst is less than 0.01 part by mass, a sufficient curing rate tends to be hardly obtainable, and if it exceeds 10 parts by mass, the storage stability of the hard coating composition tends to be deteriorated, or precipitates are likely to be formed.

Further, the hard coating composition to be used in the present invention preferably further contains an ultraviolet absorber to prevent yellowing of the resin substrate. Such an ultraviolet absorber may, for example, be a benzophenone type ultraviolet absorber, a benzotriazole type ultraviolet absorber, a benzimidazole type ultraviolet absorber, a cyanoacrylate type ultraviolet absorber, a salicylate type ultraviolet absorber, a benzylidenemalonate type ultraviolet absorber or a triazine type ultraviolet absorber. One type of such ultraviolet absorbers may be used alone, or two or more types may be used in combination. Further, in order to prevent bleeding out of such an ultraviolet absorber from the hard coating layer, an ultraviolet absorber having a trialkoxysilyl group may be used. The trialkoxysilyl group in such an ultraviolet absorber will be converted to a hydroxy group by a hydrolysis reaction at the time of forming a hard coating layer by heat curing of the organopolysiloxane, and then incorporated in the hard coating layer by a dehydration condensation reaction, whereby it is possible to prevent bleeding out of the ultraviolet absorber from the hard coating layer. Specifically, such a trialkoxysilyl group may, for example, be a trimethoxysilyl group or a triethoxysilyl group. The content of the ultraviolet absorber in the hard coating composition is preferably from 0.1 to 50 parts by mass, particularly preferably from 0.1 to 30 parts by mass, per 100 parts by mass of the organopolysiloxane.

Further, in ordinary use, in order to prevent gelation of the hard coating composition at ordinary temperature and to increase the storage stability, it is preferred to adjust the pH of the hard coating composition to be from 3.5 to 6.0, more preferably from 3.5 to 5.0. If the pH is at most 2.0 or at least 7.0, hydroxy groups bonded to silicon atoms tend to be very unstable, such being not suitable for storage. Here, in the present invention, the pH is adjusted considering formation of the middle layer, not only imparting the storage stability. It is possible to determine whether or not the middle layer is formed and to adjust its thickness, by adjusting the pH of the hard coating composition. The range of the pH of the hard coating composition to be used in the present invention is specifically such a range that in relation of the thickness (Mt) of the middle layer to be finally obtained, formed by incorporating a part of the acrylic primer layer as the middle layer, with the thickness (Ht) of the hard coating layer formed at the same time as the formation of the middle layer, the value of Mt/Ht is within a range of from 0.05 to 1.0. Such a pH range is preferably about 3.5 to about 4.5, although it depends on the type and the mass average molecular weight of the acrylic polymer to be used for the primer layer, the solubility of the acrylic polymer in the hard coating agent, the type of the organopolysiloxane contained in the hard coating composition, the thickness of the primer layer, the thickness of the hard coating layer to be finally obtained, the method of applying the hard coating composition, the method of drying and curing the hard coating composition, etc.

As a means to adjust the pH, addition of an acid or adjustment of the content of the curing catalyst may, for example, be mentioned. Such an acid may, for example, be an inorganic acid such as hydrochloric acid, sulfuric acid, nitric acid, phosphoric acid, nitrous acid, perchloric acid or sulfamic acid, or an organic acid such as formic acid, acetic acid, propionic acid, butyric acid, oxalic acid, succinic acid, maleic acid, lactic acid or p-toluenesulfonic acid, and among them, acetic acid or hydrochloric acid is preferred.

In a case where the organopolysiloxane (a) is used as the organopolysiloxane for the hard coating composition, the organopolysiloxane (a) itself has the same effects as an acid, and the pH is adjusted considering such a point.

The hard coating composition to be used in the present invention is usually prepared in a form wherein the organopolysiloxane as the essential component, and various additives as optional components, are dissolved or dispersed in a solvent.

It is necessary that all non-volatile components in the hard coating composition are stably dissolved or dispersed in the solvent, and for such a purpose, the solvent contains an alcohol in an amount of at least 20 mass %, preferably at least 50 mass %.

As the alcohol to be used for such a solvent, methanol, ethanol, 1-propanol, 2-propanol, 1-butanol, 2-butanol, 2-methyl-1-propanol, 1-methoxy-2-propanol, 2-ethoxyethanol, 4-methyl-2-pentanol or 2-butoxyethanol is preferred. Among them, an alcohol having a boiling point of from 80 to 160° C. is preferred from such a viewpoint that the solubility of the organopolysiloxane is good, and the coating properties on the resin substrate are good. Specifically, ethanol, 1-propanol, 2-propanol, 1-butanol, 2-butanol, 2-methyl-1-propanol, 1-methoxy-2-propanol, 2-ethoxyethanol, 4-methyl-2-pentanol or 2-butoxyethanol is preferred.

Further, the solvent to be used for the hard coating composition of the present invention includes a lower alcohol or the like generated along the hydrolysis of the raw material monomer such as an alkyltrialkoxysilane at the time of producing the organopolysiloxane, water in the water-dispersed type colloidal silica, which is not involved in the hydrolysis reaction, and, in a case where an organic solvent-dispersed type colloidal silica is used, such a dispersing organic solvent.

Further, in the hard coating composition to be used in the present invention, a solvent other than the alcohol which can be mixed with water/alcohol, may be used in combination as a solvent other than the above described solvent, and as such a solvent, a ketone such as acetone or acetyl acetone; an ester such as ethyl acetate or isobutyl acetate, or an ether such as propylene glycol monomethyl ether, dipropylene glycol monomethyl ether or diisopropyl ether may be mentioned.

The amount of the solvent to be used in the hard coating composition of the present invention is preferably from 50 to 3,000 parts by mass, more preferably from 150 to 2,000 parts by mass, per 100 parts by mass of the total non-volatile component in the hard coating composition.

(4-3) Formation of Hard Coating Layer and Middle Layer

The resin substrate provided with a hard coating film of the present invention can be prepared by applying the hard coating composition of the present invention on the above-obtained acrylic primer layer to form a coating film, and curing the curable compound containing the organopolysiloxane as the main component in the coating film to form a hard coating layer. On that occasion, a middle layer having the desired thickness can be formed by using the hard coating composition having its pH properly adjusted as mentioned above.

The method for applying the hard coating composition is not particularly limited and may, for example, be a usual coating method such as a spray coating method, a dip coating method or a flow coating method. It is preferred to suitably adjust the viscosity, the solid content concentration, etc. of the hard coating composition depending upon the coating method.

The hard coating composition applied to the acrylic primer layer is usually, after drying and removing the solvent under a temperature condition of from ordinary temperature to less than the heat deformation temperature of the resin substrate and the acrylic primer layer, heat-cured. The conditions for drying the solvent may, for example, be conditions at from 0 to 60° C. for from 10 minutes to 10 hours. Further, vacuum drying may also be employed while adjusting the degree of vacuum. The heat curing reaction is preferably carried out at a high temperature within a range where there will be no problem with respect to the heat resistance of the resin substrate and the acrylic primer layer, whereby curing can be completed quickly. However, for example, in a case where an organopolysiloxane having a methyl group as a monovalent organic group is used, if the temperature during the heat curing is 250° C. or higher, the methyl group will be detached by heat decomposition, such being undesirable. Therefore, the curing temperature is preferably from 50 to 200° C., more preferably from 80 to 160° C., particularly preferably from 100° C. to 140° C. The curing time is preferably from 10 minutes to 4 hours, more preferably from 20 minutes to 3 hours, particularly preferably from 30 minutes to 2 hours.

The thickness (the thickness before curing) of the coating film formed by applying the hard coating composition to the surface of the acrylic primer layer depends on the solid content concentration in the composition. It is preferably properly adjusted e.g. by considering the solid content concentration so that the relation of the thickness between the silicone type hard coating layer and the middle layer to be formed after the hard coating composition is cured is within a range of the relation of the present invention, and the practical thicknesses are within the predetermined range, preferably within the following range.

Here, in the resin substrate provided with a hard coating film of the present invention, the relation between the thickness (Mt) of the middle layer to be formed at the same time as the silicone type hard coating layer and the thickness (Ht) of the hard coating layer as described hereinafter is, as the value of Mt/Ht, from 0.05 to 1.0, preferably from 0.1 to 0.95, by adjusting the pH of the hard coating composition as described above.

The thickness of the silicone type hard coating layer formed on the acrylic primer layer via the middle layer is preferably at least 1 μm and at most 20 μm, more preferably at least 1 μm and at most 10 μm, particularly preferably at least 2 μm and at most 10 μm, as a thickness of the hard coating layer by itself in a state after cured, that is, in a state of the final resin substrate provided with a hard coating film of the present invention after formation of the silicone type hard coating layer and the middle layer is completed.

If the thickness of the hard coating layer in a state of the resin substrate provided with a hard coating film of the present invention is too thin, it tends to be difficult to secure sufficient abrasion resistance even with a constitution of the acrylic primer layer/middle layer/silicone type hard coating layer according to the present invention. On the other hand, if the thickness of the hard coating layer is too thick, cracks or separation is likely to occur. Accordingly, in order to suppress formation of cracks and separation while sufficient abrasion resistance is secured, the thickness of the hard coating layer is preferably at least 1 μm and at most 20 μm.

In the resin substrate provided with a hard coating film of the present invention, in order to further improve the abrasion resistance or film strength, a top coating layer containing $SiO_2$ as the main component may be applied on the hard coating layer of the above resin substrate provided with a hard coating film. As the method for forming such a top coating layer containing $SiO_2$ as the main component, a method of applying a poly(perhydro)silazane on the above hard coating layer, followed by curing, or a method of vapor deposition, sputtering or the like, may preferably be used.

[Process for Producing Resin Substrate Provided with Hard Coating Film of the Present Invention]

The resin substrate provided with a hard coating film of the present invention comprises a resin substrate, and an acrylic primer layer, a middle layer and a silicone type hard coating layer in this order from the resin substrate side, wherein the middle layer contains constituting components contained in the acrylic primer layer and the silicone type hard coating layer, and the relation between the thickness (Mt) of the middle layer and the thickness (Ht) of the silicone type hard coating layer, as a value of Mt/Ht, is within a range of from 0.05 to 1.0. A process for producing such a resin substrate provided with a hard coating film of the present invention comprises at least the following steps (1) and (2) in this order.

(1) A step of applying a primer composition containing the acrylic polymer as the main component on at least one side of the resin substrate and drying it to form an acrylic primer layer.

(2) A step of applying a hard coating composition containing the organopolysiloxane having its pH adjusted so that the ratio in thickness of the middle layer to the hard coating layer represented by the thickness (Mt) of the middle layer/the thickness (Ht) of the hard coating layer, becomes from 0.05 to 1.0, on the above obtained acrylic primer layer and drying the composition to form a middle layer containing the acrylic polymer and a cured product of the organopolysiloxane as the main components and a silicone type hard coating layer.

The above step (1) is as described in the above (3) primer layer, and the step (2) is as described in the above (4) hard coating layer.

EXAMPLES

Now, the present invention will be described in further detail with reference to Examples, but it should be understood that the present invention is by no means restricted by these Examples. Organopolysiloxanes were analyzed by the following method.

(1) Number (B) of Hydroxy Groups Bonded to Silicon Atoms/Number (A) of Alkoxy Groups Bonded to Silicon Atoms Organopolysiloxanes used in the following Examples were only those having methoxy groups bonded to silicon atoms ($SiO-CH_3$) as alkoxy groups bonded to silicon atoms, and therefore, as the above (B)/(A), a ratio of $Si-OH/SiO-CH_3$ obtained by the following method, was used.

Using an infrared absorption analyzer (FT-IR, model: Avatar/Nicolet FT-IR360, manufactured by Thermo Fisher Scientific K.K.), the ratio of $Si-OH/SiO-CH_3$ was obtained from the area ratio of the absorption attributable to $SiO-CH_3$ in the vicinity of 2,860 $cm^{-1}$ and the absorption attributable to $Si-OH$ in the vicinity of 900 $cm^{-1}$.

(2) Analyses of Bonding States of Silicon Atoms in Organopolysiloxanes

The bonding states of silicon atoms in organopolysiloxanes, specifically, the abundance ratios of M units, D units, T units and Q units, and the abundance ratios of T0 to T3, were respectively obtained from the peak area ratios of $^{29}Si$-NMR by means of a nuclear magnetic resonance analyzer ($^{29}Si$-NMR: ECP400 manufactured by JEOL Ltd.). The measuring conditions are such that a 10 mmφ test tube made of a polytetrafluoroethylene is used, the probe is T10, the resonant frequency is 79.42 MHz, the pulse width is 10 μsec, the waiting time is 20 sec, the cumulated number is 1,500 times, the relaxation agent contains 0.1 mass % of Cr $(acac)_3$, and the external standard sample is tetramethylsilane. Further, the chemical shifts of $^{29}Si$-NMR attributable to the respective structures are as follows, in the case of a methyl type organopolysiloxane.

(M Units to Q Units)
  M units: 15 to 5 ppm,
  D units: −15 to −25 ppm,
  T units: −35 to −75 ppm,
  Q units: −90 to −130 ppm.
(T0 to T3)
  T0: −40 to −41 ppm,
  T1: −49 to −50 ppm,
  T2: −57 to −59 ppm,
  T3: −66 to −70 ppm.

(3) Number Average Molecular Weight Mn, Mass Average Molecular Weight Mw and Dispersivity Mw/Mn They were obtained by means of gel permeation chromatography (GPC, Waters 2695 manufactured by Waters Corporation, RI detection, column: Styragel guard colum+HR1+HR4+HR5E, eluent: chloroform).

[1] Synthesis of Organopolysiloxane (a) (MSi-1)

Into a 0.2 L flask, a methyl type silicone resin KR-500 (manufactured by Shin-Etsu Chemical Co., Ltd., comprising substantially $SiO-CH_3$, no peak attributable to $Si-OH$ groups observed by FT-IR, the abundance ratios of the respective T units are T0:T1:T2:T3=ND:15:58:27, Mn=700, Mw=1,240, Mw/Mn=1.77) (10 g) and 1-butanol (10 g) were added and thoroughly stirred, and acetic acid (10 g) and ion-exchanged water (10 g) were added and further thoroughly stirred. The obtained solution was stirred at 40° C. for one hour to obtain an organopolysiloxane (a) "MSi-1". This solution containing MSi-1 (MSi-1 concentration: 25 mass %) was used as it was for the after-described [3] Preparation of hard coating composition.

With respect to the obtained MSi-1, a comparison with KR-500 being the raw material was carried out by means of FT-IR, whereby a decrease of the peak attributable to $SiO-CH_3$ groups and an appearance of the peak attributable to $Si-OH$ groups were confirmed. The ratio of $Si-OH/SiO-CH_3$ in MSi-1 obtained from the peak area ratio of FT-IR was 41.0. MSi-1 was constituted by T units, and the abundance ratios of the respective T units obtained from the chemical shifts of $^{29}Si$-NMR were T0:T1:T2:T3=ND:1.1:30.1:68.8. Mn of MSi-1 was 520, Mw was 1,150, and Mw/Mn was 2.22.

[2] Synthesis of Organopolysiloxane (b) (PSi-1) and Preparation of Organopolysiloxane (b) Composition Solution Into a 1 L flask, 200 g of aqueous silica sol having an average particle size of about 15 nm (pH 3.1, fine silica particle solid content: 35 mass %) and 0.2 g of acetic acid were charged, and 138 g methyltrimethoxysilane was added. After stirring for one hour, this composition was aged at 25° C. for 4 days to ensure the partial hydrolytic condensation in the silica/methanol aqueous dispersion.

In this composition, the non-volatile component was 40 mass %, and the obtained organopolysiloxane (hereinafter referred to as the organopolysiloxane (b) "PSi-1") had bond structures composed mainly of T units (number of T units: total number of M units, D units and Q units=100:0), and the abundance ratios of the respective T units obtained from the chemical shifts of $^{29}Si$-NMR were T0:T1:T2:T3=ND:2:54:44. In the obtained organopolysiloxane, monomer-form T0 [$R-Si(OH)_3$] (wherein R is a monovalent organic group) was not substantially present, and it was confirmed that the starting material methyltrimethoxysilane was substantially completely converted to an oligomer-form organopolysiloxane. Mn of the obtained organopolysiloxane (b) PSi-1 was 400, Mw was 670, and Mw/Mn was 1.68.

To 100 parts by mass of the organopolysiloxane (b) PSi-1 solution obtained as described above (containing fine silica particles (c)), 4 parts by mass of a benzophenone type ultraviolet absorber was added, followed by aging at 25° C. for at least 24 hours. By using 1-butanol and isopropanol as diluting solvents, an organopolysiloxane (b) PSi-1 composition solution having 25 mass % of a non-volatile component (150° C., 45 minutes) and a viscosity of 4.4 mPa·s was prepared. The pH of the composition was stabilized at 5.0.

[3] Preparation of Hard Coating Composition

Hard coating compositions HC-1 to HC-6 having a composition and a pH as identified in Table 1 were obtained by using the organopolysiloxane (b) composition solution containing the organopolysiloxane (b) PSi-1 obtained in the above [2], the solution containing the organopolysiloxane (a) MSi-1 obtained in the above [1] and additives for pH adjustment as identified in Table 1.

TABLE 1

| Hard coating composition | PSi-1 solution (b) (parts by mass) | Solid content (parts by mass) in PSi-1 solution (b) | | | MSi-1 solution (a) (parts by mass) | Solid content (parts by mass) in MSi-1 solution (a) | Additives (parts by mass) | pH of hard coating composition |
|---|---|---|---|---|---|---|---|---|
| | | PSi-1 | Fine silica particles | Ultraviolet absorber | | | | |
| HC-1 | 100 | 16.8 | 7.2 | 1.0 | — | — | — | 5.0 |
| HC-2 | 100 | 16.8 | 7.2 | 1.0 | — | — | Acetic acid (5 parts) | 4.2 |
| HC-3 | 80 | 13.4 | 5.8 | 0.8 | 20 | 5 | — | 4.1 |
| HC-4 | 80 | 13.4 | 5.8 | 0.8 | 20 | 5 | Acetic acid (20 parts) | 3.0 |
| HC-5 | 100 | 16.8 | 7.2 | 1.0 | — | — | Diacetone alcohol (25 parts) | 4.9 |
| HC-6 | 100 | 16.8 | 7.2 | 1.0 | — | — | 0.01N hydrochloric acid (0.02 part) | 3.9 |

[4] Preparation of Resin Substrate Sample Provided with Hard Coating Film

By using the hard coating compositions obtained in the above [3], resin substrate samples provided with a hard coating film in Examples were prepared as follows. Examples 1 to 5 are Examples of the present invention, and Examples 6 to 8 are Comparative Examples.

Example 1

To a polycarbonate resin plate having a thickness of 3 mm (CARBOGLASS (registered trademark) Polish Clear (tradename, manufactured by Asahi Glass Company, Limited)), an acrylic primer SHP470 (manufactured by Momentive Performance Materials, Inc.) was applied by a dipping method so that the film thickness after drying would be from 4 to 5 µm, followed by heat drying at 120° C. for 30 minutes by means of a hot air circulation system dryer (manufactured by SANYO Electric Co., Ltd., CONVECTION OVEN MOV-202F) to form a primer layer. Then, to the obtained primer layer, the hard coating composition HC-2 was applied by a dipping method and left to stand at 25° C. for 20 minutes, followed by curing at 120° C. for 1 hour to prepare a sample of a resin substrate provided with a hard coating film. The film thickness of the layer formed on the primer layer (confirmed to consist of a middle layer and a hard coating layer by the after-described SEM observation) was 3.6 µm. This sample is a sample having the acrylic primer layer, the middle layer and the hard coating layer formed on both sides of the polycarbonate plate, according to the after-mentioned SEM observation. The presence or absence of abnormality was visually judged and as a result, the sample had no problem on the initial appearance.

Examples 2 and 3

Samples of resin substrates provided with a hard coating film were prepared in the same manner as in the above Example 1 except that the hard coating composition HC-3 or HC-6 prepared in the above [3] was applied by a dipping method so that the thicknesses would be as identified in Table 2. The presence or absence of abnormality was visually judged and as a result, all the samples had no problem in the initial appearance.

Example 4

To a polycarbonate resin plate having a thickness of 3 mm (CARBOGLASS (registered trademark) Polish Clear (tradename, manufactured by Asahi Glass Company, Limited)), an acrylic primer SHP470 (manufactured by Momentive Performance Materials, Inc.) was applied by a flow coating method so that the film thickness would be from 4 to 5 µm. Then, the hard coating composition HC-3 was applied by a flow coating method and left to stand at 25° C. for 20 minutes, followed by curing at 120° C. for 1 hour to prepare a sample of a resin substrate provided with a hard coating film. The film thickness of the layer (confirmed to consist of a middle layer and a hard coating layer by the after-mentioned SEM observation) formed on the primer layer was 8.4 µm. This sample is a sample having the acrylic primer layer, the middle layer and the hard coating layer formed on one side of the polycarbonate plate, according to the after-mentioned SEM observation. The presence or absence of abnormality was visually judged and as a result, the sample had no problem in the initial appearance.

Example 5

To a polycarbonate resin plate having a thickness of 3 mm (CARBOGLASS (registered trademark) Polish Clear (tradename, manufactured by Asahi Glass Company, Limited)), an acrylic primer SHP470 (manufactured by Momentive Performance Materials, Inc.) was applied by a dipping method so that the film thickness would be from 4 to 5 µm. Then, the hard coating composition HC-3 was applied by a spray coating method and left to stand at 25° C. for 20 minutes, followed by curing at 120° C. for 1 hour to prepare a sample of a resin substrate provided with a hard coating film. The film thickness of the layer (confirmed to consist of a middle layer and a hard coating layer by the after-mentioned SEM observation) formed on the primer layer was 6.7 µm. This sample is a sample having the acrylic primer layer, the middle layer and the hard coating layer formed on one side of the polycarbonate plate, according to the after-mentioned SEM observation. The presence or absence of abnormality was visually judged and as a result, the sample had no problem in the initial appearance.

Examples 6 to 8

Samples of resin substrates provided with a hard coating film were prepared in the same manner as in the above Example 1 except that the hard coating composition HC-1, HC-4 or HC-5 prepared in the above [3] was applied so that the film thicknesses were as identified in Table 2. All the samples had no problem in the initial appearance.

[5] Observation of Layer Constitution in Hard Coating Film of Resin Substrate Provided with Hard Coating Film Each of the samples obtained in the above Examples was cut into a thickness of about 1 mm by a precision cutting machine, cooled in liquid nitrogen and then sawn. Then, a cross section was prepared by Cross Section Polisher (manufactured by Hitachi, Ltd., E-3500), carbon coating (manufactured by Sanyu Electron Co., Ltd., CARBON COATER, corresponding to 30 nm) was carried out, and the cross section of the sample was observed by using a scanning electron microscope (manufactured by JEOL, Ltd., JXA-8500F). The accelerating voltage/current was 8 kV/0.1 nA, and both of a secondary electron image (SE image) and a compositional image in BE mode (COMP image) were compared.

In the cross-sectional SEM image of the sample of the resin substrate provided with a hard coating film obtained in Example 2, a middle layer different in the contrast was observed between the primer layer and the hard coating layer. When the composition contrasts of the respective layers were compared in the COMP image, whereupon this layer was estimated to be a middle layer having components of the primer layer and the hard coating layer dissolved each other, intermediate between these layers, and the film thickness of the hard coating layer was 2.2 µm and the film thickness of the middle layer was 1.9 µm.

In all the samples obtained in the above Examples 1 to 5, as a result of the SEM observation of the cross sections of the samples, a middle layer different in the contrast was confirmed between the primer layer and the hard coating layer. The thicknesses of the middle layer confirmed were from 0.7 µm to 1.9 µm. The thickness of the hard coating layer and the thickness of the middle layer are shown in Table 2. With respect to all the samples obtained in Examples 1 to 5, the ratio of the middle layer thickness (Mt)/hard coating layer thickness (Ht) was confirmed to be within a range of the present invention of from 0.05 to 1.0.

Further, with respect to the sample of the resin substrate provided with a hard coating film obtained in Example 2, in order to confirm the composition of the middle layer, the intensity of SiKα rays was measured by a field emission electron probe microanalyzer (manufactured by JEOL Ltd., FE-EPMA). The accelerating voltage/current was 15 kV/30 nA.

First, the intensity counts of the SiKα rays at two points on each of the hard coating layer and the middle layer were measured by FE-EPMA. The intensity counts of the SiKα rays at two points on the hard coating layer were 495,536 and 484,174, and the average was 489,855. The intensity counts of the SiKα rays at two points on the middle layer were 438,764 and 443,286, and the average was 441,025. The intensity of the SiKα rays was different between the hard coating layer and the middle layer, and it was low in the middle layer as compared with the hard coating layer. The results support the result of observation of the middle layer different in the contrast as observed in the COMP image, and it became clear that the middle layer is a layer in which the hard coating layer and the primer layer were dissolved each other. Further, from the intensity count (average) of the SiKα rays, the compositional ratio in the Si atoms of the hard coating layer to the middle layer was calculated to be 10:9.

Further, in order to confirm the middle layer in further detail, with respect to the sample of the resin substrate provided with a hard coating film obtained in the above Example 2, the depth profiling was carried out by a scanning X-ray photoelectron spectrometer (µ-ESCA, manufactured by ULVAC-PHI, INCORPORATED, Quantera SXM). As the X-ray source, monochromatized AlKα by a monochromater was employed, the degree of vacuum was >7.0×10$^{-8}$ Torr at the time of Ar+ sputter etching and >5.0×10$^{-8}$ Torr at the time of measurement, the accelerating voltage was 4 kV, the raster was 2 mm×2 mm, the interval was 1 minute, and the sputter etching rate was 105 nm/min.

From the results of the depth profiling, the compositional behavior of the middle layer was clearly distinct from the hard coating layer, and it was suggested that the middle layer consists of Si atoms, C atoms and O atoms. This supports the results of observation of the middle layer different in the contrast as observed in the COMP image.

On the other hand, with respect to the samples of the resin substrates provided with a hard coating film obtained in Examples 6 to 8, as a result of the SEM observation of the cross sections of samples, no middle layer was observed between the primer layer and the hard coating layer.

Further, with respect to the sample of the resin substrate provided with a hard coating film obtained in Example 7, as a result of the SEM observation of the cross section of the sample, a middle layer was observed between the primer layer and the hard coating layer. The thickness of the hard coating layer was 1.6 µm, and the thickness of the middle layer was 2.1 µm. The results of measurement of the thickness are shown in Table 2. The sample of the resin substrate provided with a hard coating film obtained in Example 7 is out of the range of the present invention, with a ratio of the middle layer thickness (Mt)/the hard coating layer thickness (Ht) exceeding 1.0.

[6] Evaluation of Resin Substrate Sample Provided with Hard Coating Film

With respect to the resin substrate samples provided with a hard coating film obtained in the respective Examples in the above [4], evaluations of the following items were carried out. In Table 2, the thicknesses of the respective layers constituting the hard coating film, and the initial adhesion, the abrasion resistance and the weather-cracking resistance and the weather-resistant adhesion after the weather resistance test are shown.

<1> Thickness

<1-1> Thicknesses of Hard Coating Layer and Primer Layer

The total thickness of the hard coating layer and the middle layer and the thickness of the primer layer of each sample were measured by using an interference film thickness measuring apparatus (manufactured by Spectra Co-op, Solid lambda Thickness). At that time, as the refractive index, values of n=1.46 (hard coating layer and middle layer) and n=1.56 (primer layer) were used. Further, the thickness of the hard coating layer was estimated by the SEM observation of the cross section of the sample.

<1-2> Thickness of Middle Layer

The thickness of the middle layer was estimated by the SEM observation of the cross section of each sample.

<2> Initial Sample Evaluation

<2-1> Initial Abrasion Resistance

In accordance with JIS K5600(5.9), on a Taber abrasion tester (model ROTARY ABRASION TESTER, manufactured by Toyo Seiki Seisaku-sho, Ltd.), a truck wheel CALIBRASE (registered trademark) CS-10F (manufactured by TABER Industries) was mounted and rotated 500 times under a load of 500 g, whereupon the haze was measured, and the haze difference $\Delta H_{500}$ between before and after the test was taken as the abrasion resistance. The haze was measured in accordance with JIS K7105(6.4) by means of a haze meter (Model: HGM-2 manufactured by Suga Test Instruments Co., Ltd.). As a judgment standard, $\Delta H_{500} \leq +10$ was regarded as "pass".

<2-2> Initial Adhesion

In accordance with JIS K5600(5.6), by means of a laser blade, 11 cut lines were made at 1 mm intervals in each of the vertical and horizontal directions to form 100 squares, and Cellotape (registered trademark) (CT24, manufactured by Nichiban Co., Ltd.) was well bonded thereto, followed by a peel test. The number of squares where the hard coating film remained without delamination was represented by X, and X=25 was regarded as "pass" and represented as "○".

TABLE 2

| | | | | Thickness, etc. of layers in hard coating film | | | | Results of evaluation of resin substrate provided with hard coating film | | | |
| | | | | | | | | | Weather resistance | | |
| | | | | Primer | Hard coating | Middle | | Initial | | test after 600 hours | |
| | Hard coating composition | | Coating | layer thickness | layer thickness (Ht) | layer thickness (Mt) | | Abrasion resistance | | Weather-crack | Weather-resistant |
| Ex. | Type | pH | method | [μm] | [μm] | [μm] | Mt/Ht | ΔH$_{500}$ | Adhesion | resistance | adhesion |
|---|---|---|---|---|---|---|---|---|---|---|---|
| Ex. 1 | HC-2 | 4.2 | Dipping | 5.1 | 2.7 | 0.9 | 0.33 | 7.1 | ○ | ○ | ○ |
| Ex. 2 | HC-3 | 4.1 | Dipping | 3.7 | 2.2 | 1.9 | 0.86 | 6.1 | ○ | ○ | ○ |
| Ex. 3 | HC-6 | 3.9 | Dipping | 4.2 | 2.2 | 1.0 | 0.45 | 6.0 | ○ | ○ | ○ |
| Ex. 4 | HC-3 | 4.1 | Flow | 7.8 | 6.8 | 1.6 | 0.23 | 6.6 | ○ | ○ | ○ |
| Ex. 5 | HC-3 | 4.1 | Spray | 3.0 | 6.0 | 0.7 | 0.12 | 6.9 | ○ | ○ | ○ |
| Ex. 6 | HC-1 | 5.0 | Dipping | 4.1 | 4.1 | ND | — | 6.5 | ○ | ○ | X |
| Ex. 7 | HC-4 | 3.0 | Dipping | 4.6 | 1.6 | 2.1 | 1.31 | 3.9 | ○ | X | ○ |
| Ex. 8 | HC-5 | 4.9 | Dipping | 3.9 | 2.7 | ND | — | 7.6 | ○ | X | X |

Nichiban Co., Ltd.) was well bonded thereto, followed by a peel test. The number of squares where the hard coating film remained without delamination is represented by X, and X=100 was regarded as "pass" and represented as "○".

<3> Weather Resistance Test

Using an accelerated weather resistance tester (DAIPLA METAL WEATHER KU-R4 manufactured by DAIPLA WINTES CO., LTD) employing a metal halide lamp as a light source, three conditions of light irradiation, dew condensation and total darkness were continuously applied, and after 600 hours, the presence or absence of cracks and delamination was visually evaluated as follows (weather-cracking resistance). Further, the adhesion after 600 hours was evaluated as follows (weather-resistant adhesion). Here, the conditions for the above irradiation are such that light is applied for 4 hours under such conditions that the illuminance is 90 mW/cm$^2$, the black panel temperature is 63° C. and the relative humidity is 70%; the conditions for the dew condensation are such that the black panel temperature is naturally left to cool to 30° C. and maintained for 4 hours under a condition of a relative humidity of 98% without irradiation with light; and the conditions for the above total darkness are such that the sample is maintained for 4 hours without irradiation with light under such conditions that the black panel temperature is 70° C. and the relative humidity is 90%.

<3-1> Weather-Cracking Resistance

Before the weather resistance test (initial stage)/after the weather resistance test, the appearance of the hard coating film was visually observed based on the following standards, and the presence or absence of abnormality was judged.

○: No abnormality observed

X: Cracks observed in the hard coating film

<3-2> Adhesion after Weather Resistance Test (Weather-Resistant Adhesion)

In accordance with JIS K5600(5.6), by means of a laser blade, 6 cut lines were made on the hard coating film at 1 mm intervals in each of the vertical and horizontal directions to form 25 squares, and Cellotape (registered trademark) (CT- As shown in Table 2, in the samples in Examples 6 to 8 obtained by the dip coating method, cracks were formed in the hard coating film after 600 hours in the weather resistance test, or the judgment of the adhesion after the weather resistance test was "X", and thus, they failed the test. In the samples obtained in Examples 6 and 8, no middle layer was observed. Further, in the sample obtained in Example 7, although a middle layer was observed by the SEM observation of the cross section, the judgment of the weather-crack resistance after the weather resistance test was "X". The sample obtained in Example 7 was out of the range of the present invention, with a ratio of the middle layer thickness (Mt)/the hard coating layer thickness (Ht) exceeding 1.0.

On the other hand, with the samples in Examples 1 to 3 obtained by the dip coating method, the judgment of the appearance of the hard coating film after 600 hours in the weather resistance test and the adhesion test after the weather resistance test was "○", whereas it was "X" with respect to the samples in Examples 6 to 8, thus indicating that they are excellent in the weather-cracking resistance and the adhesion. Of the samples obtained in Examples 1 to 3, the composition constituting the middle layer can be determined by the intensity counts of SiKα rays, the compositional ratio in the Si atoms of the hard coating layer to the middle layer is 10:9, and the ratio of the middle layer thickness (Mt)/the hard coating layer thickness (Ht) ratio is within a range of the present invention of from 0.05 to 1.0.

Further, also with the samples in Examples 4 and 5 obtained by the flow coating method or the spray coating method, no cracks were formed in the hard coating film after 600 hours in the weather resistance test, and the judgment of the adhesion after the weather resistance test was "○", and thus, they passed the tests. With respect to the samples obtained in Examples 4 and 5 also, in the same manner as the samples in Examples 1 to 3, the ratio of the middle layer thickness (Mt)/the hard coating layer thickness (Ht) ratio is within a range of the present invention of from 0.05 to 1.0. This indicates that the weather resistance can be improved by optimizing the ratio of the thickness of the middle layer to the thickness of the hard coating layer, regardless of the coating method.

Here, among the samples in Examples, in Examples 1 to 5 in which the ratio of the middle layer thickness (Mt)/the hard coating layer thickness (Ht) is within a range of the present invention of from 0.05 to 1.0, the pH of the hard coating composition used for preparation of the middle layer and the hard coating layer was well adjusted to be from 3.9 to 4.2, so that Mt/Ht would be within the range of the present invention. Whereas, the pHs of the hard coating compositions used in Examples 6 and 8 were so high as 5.0 and 4.9, and the pH of the hard coating composition used in Example 7 was so low as 3.0, and thus such pHs lead to the Mt/Ht in the obtained samples being out of the range of the present invention.

From the above results, the resin substrate provided with a hard coating film of the present invention is a resin substrate provided with a hard coating film having the abrasion resistance maintained, having more excellent weather crack resistance and adhesion after the weather resistance test than conventional one, and having improved weather resistance. This is considered to be because the presence of the middle layer between the hard coating layer and the primer layer can reduce the formation of thermal stress to the hard coating film due to thermal expansion of the substrate and expansion by moisture at the time of the weather resistance test, by the composition constituting the middle layer and by the ratio of the middle layer thickness (Mt)/the hard coating layer thickness (Ht), and as a result, cracks after the weather resistance test are suppressed and further the adhesion can be improved.

INDUSTRIAL APPLICABILITY

The resin substrate provided with a hard coating film of the present invention is useful as a window glass for a vehicle, to be attached to automobiles or various means of transportation, or as a window glass for a building material to be attached to building construction such as houses or buildings.

This application is a continuation of PCT Application No. PCT/JP2010/073025, filed on Dec. 21, 2010, which is based upon and claims the benefit of priority from Japanese Patent Application No. 2009-295347 filed on Dec. 25, 2009. The contents of those applications are incorporated herein by reference in its entirety.

REFERENCE SYMBOLS

1: resin substrate provided with hard coating film, 2: resin substrate, 3: acrylic primer layer, 4: middle layer, 5: silicone type hard coating layer, Mt: thickness of middle layer 4, Ht: thickness of silicone type hard coating layer 5

What is claimed is:

1. A hard coat resin substrate comprising:
a substrate comprising at least one resin;
a primer layer formed on the substrate, the primer layer comprising an acrylic polymer as a main component;
a hard coating layer comprising a cured product of at least one organopolysiloxane as a main component; and
a middle layer formed between the primer layer and the hard coating layer,
wherein the primer layer, the middle layer, and the hard coating layer are formed on at least one side of the substrate in an order of the substrate, the primer layer, the middle layer, and the hard coating layer,
the middle layer has a thickness Mt, the hard coating layer has a thickness Ht, and a ratio in thickness of the middle layer to the hard coating layer represented by Mt/Ht is from 0.05 to 1.0.

2. The hard coat resin substrate according to claim 1, wherein the organopolysiloxane is composed solely of T units and Q units, and a ratio in number of T:Q is from 90 to 100:10 to 0.

3. The hard coat resin substrate according to claim 1, wherein the hard coating layer further comprises fine silica particles.

4. The hard coat resin substrate according to claim 1, wherein the acrylic polymer comprises, as a main component, a homopolymer or copolymer comprising a monomer having a methacryloyl group as main monomer units.

5. The hard coat resin substrate according to claim 4, wherein the monomer is an alkyl methacrylate having an alkyl group having at most 6 carbon atoms.

6. The hard coat resin substrate according to claim 1, wherein the acrylic polymer has a mass average molecular weight of from 20,000 to 1,000,000.

7. The hard coat resin substrate according to claim 1, wherein the thickness of the hard coating layer is from 1 µm to 20 µm.

8. The hard coat resin substrate provided with a hard according to claim 1, wherein the primer layer has a thickness of from 0.1 µm to 10 µm.

9. The hard coat resin substrate according to claim 1, wherein the at least one resin of the substrate comprises a polycarbonate resin.

10. A process for producing the hard coat resin substrate as defined in claim 1, which comprises:
applying a primer composition comprising the acrylic polymer as a main component to at least one side of the substrate;
drying the primer composition to form the primer layer;
adjusting a pH of a hard coating composition comprising the at least one organopolysiloxane;
applying the hard coating composition having the pH adjusted on the primer layer; and
curing the hard coating composition to form the middle layer and the hard coating layer,
wherein the pH of the hard coating composition is adjusted such that the middle layer and the hard coating layer satisfy the ratio Mt/Ht of from 0.05 to 1.0 after the curing.

11. The process according to claim 10, wherein the pH of the hard coating composition is adjusted to fall within a range of from 3.5 to 4.5.

12. The process according to claim 10, wherein the pH of the hard coating composition is adjusted such that the middle layer and the hard coating layer satisfy the ratio Mt/Ht of from 0.1 to 0.95 after the curing.

13. The process according to claim 10, wherein the acrylic primer layer has a thickness of at least 3 µm and at most 10 µm before the middle layer and the hard coating layer are formed, and the thickness of the acrylic primer layer after the hard coating layer and the middle layer are formed is at least 2 µm and at most 8 µm.

14. The process according to claim 10, wherein the middle layer and the hard coating layer are formed at the same time.

15. The process according to claim 10, wherein the curing is performed at a temperature of from 50° C. to 200° C.

16. The process according to claim 14, wherein the curing is performed at a temperature of from 100° C. to 140° C.

17. The hard coat resin substrate according to claim 1, wherein the at least one organopolysiloxane comprises a first organopolysiloxane and a second organopolysiloxane, the first organopolysiloxane has a mass average molecular weight of from 800 to 8,000, and the second organopolysiloxane has a mass average molecular weight of between 1/10 and 1/1.5 of the mass average molecular weight of the first organopolysiloxane.

18. The hard coat resin substrate according to claim 1, wherein the at least one organopolysiloxane comprises a first organopolysiloxane and a second organopolysiloxane, the first organopolysiloxane has a mass average molecular weight of from 1,000 to 6,000, and the second organopolysiloxane has a mass average molecular weight of between 1/8 and 1/1.5 of the mass average molecular weight of the first organopolysiloxane.

19. The process according to claim 10, wherein the hard coating composition is applied by a flow coating method.

* * * * *